US012749752B2

(12) United States Patent
Zhao et al.

(10) Patent No.: US 12,749,752 B2
(45) Date of Patent: Sep. 29, 2026

(54) BATTERY PACKS CONTAINING CONFIGURABLE TERMINAL HOLDER

(71) Applicant: TECHTRONIC CORDLESS GP, Anderson, SC (US)

(72) Inventors: Jiang Zhao, Guangdong (CN); Jian Guo Zhao, Guangdong (CN); Ya Bin Liu, Guangdong (CN); Yuan Bai Wu, Guangdong (CN); Shang Hong Wang, Guangdong (CN)

(73) Assignee: TECHTRONIC CORDLESS GP, Anderson, SC (US)

(*) Notice: Subject to any disclaimer, the term of this patent is extended or adjusted under 35 U.S.C. 154(b) by 1395 days.

(21) Appl. No.: 17/276,416

(22) PCT Filed: Oct. 19, 2018

(86) PCT No.: PCT/CN2018/111051
§ 371 (c)(1),
(2) Date: Mar. 15, 2021

(87) PCT Pub. No.: WO2020/077618
PCT Pub. Date: Apr. 23, 2020

(65) Prior Publication Data

US 2022/0037743 A1 Feb. 3, 2022

(51) Int. Cl.
*H01M 10/00* (2006.01)
*H01M 10/42* (2006.01)
(Continued)

(52) U.S. Cl.
CPC ....... *H01M 50/213* (2021.01); *H01M 10/425* (2013.01); *H01M 50/186* (2021.01);
(Continued)

(58) Field of Classification Search
CPC ............. H01M 50/213; H01M 10/425; H01M 50/186; H01M 50/503; H01M 50/519;
(Continued)

(56) References Cited

U.S. PATENT DOCUMENTS 8,563,165 B2 10/2013 Takayama
2004/0257033 A1 12/2004 Kubota et al.
(Continued)

FOREIGN PATENT DOCUMENTS

CN 1568554 A 1/2005
CN 1808741 A 7/2006
(Continued)

OTHER PUBLICATIONS

International Patent Application No. PCT/CN2018/111051; International Search Report; Jul. 26, 2019; (2 pages).
(Continued)

*Primary Examiner* — Nicholas P D'Aniello
(74) *Attorney, Agent, or Firm* — Dority & Manning, P.A.

(57) ABSTRACT

A battery pack including a housing; and two or more battery cells located in the housing. The two or more battery cells interconnected by a configurable connector which is configured to enable electrical connections between the two or more battery cells. The configurable connector contains a plurality of first electrical terminals connected to the two or more battery cells, and a terminal holder adapted to be removably connected to the plurality of the first electrical terminals. The terminal holder is adapted to be installed to the housing in a first orientation at which the two or more battery cells are electrically connected, or in a second orientation at which the two or more battery cells are not electrically connected. The terminal holder contains a plurality of second electrical terminals. One of the plurality of the second electrical terminals always engages with a same
(Continued)

one of the plurality of the first electrical terminals, when the terminal holder is installed to the housing in the first orientation or the second orientation. The single terminal holder can be installed to battery pack in different orientations for enabling/disabling the internal circuit of the battery pack, and can be locked by a latch mechanism, which reduces the chance that the terminal holder is accidentally lost during usage.

29 Claims, 22 Drawing Sheets

(51) Int. Cl.
*H01M 50/186* (2021.01)
*H01M 50/213* (2021.01)
*H01M 50/503* (2021.01)
*H01M 50/519* (2021.01)

(52) U.S. Cl.
CPC ....... *H01M 50/503* (2021.01); *H01M 50/519* (2021.01); *H01M 2010/4271* (2013.01); *H01M 2220/30* (2013.01)

(58) Field of Classification Search
CPC ...... H01M 2010/4271; H01M 2220/30; Y02E 60/10
See application file for complete search history.

(56) References Cited

U.S. PATENT DOCUMENTS

| | | | | |
|---|---|---|---|---|
| 2006/0132090 | A1 | 6/2006 | Suzuki | |
| 2008/0061738 | A1* | 3/2008 | Hanawa | H01M 10/48 320/112 |
| 2014/0302353 | A1* | 10/2014 | Ogura | H01M 50/572 429/7 |
| 2015/0206461 | A1* | 7/2015 | Jubro | H01M 50/507 429/96 |
| 2016/0020443 | A1 | 1/2016 | White et al. | |
| 2016/0126533 | A1 | 5/2016 | Velderman et al. | |
| 2017/0025650 | A1 | 1/2017 | Altenburger et al. | |
| 2018/0040927 | A1 | 2/2018 | Rejman | |
| 2018/0366697 | A1* | 12/2018 | Elfering | H01M 50/516 |
| 2019/0020072 | A1* | 1/2019 | Fauteux | H02J 7/0042 |
| 2019/0067672 | A1 | 2/2019 | Park et al. | |

FOREIGN PATENT DOCUMENTS

| | | | |
|---|---|---|---|
| CN | 102376924 | A | 3/2012 |
| CN | 103050740 | | 4/2013 |
| CN | 203261085 | U | 10/2013 |
| CN | 103802075 | A | 5/2014 |
| CN | 104466045 | A | 3/2015 |
| CN | 205985178 | U | 2/2017 |
| CN | 107431158 | A | 12/2017 |
| CN | 109075299 | A | 12/2018 |
| JP | H0855616 | A | 2/1996 |
| JP | 2016051684 | A | 4/2016 |
| WO | WO2017094983 | A1 | 6/2017 |
| WO | WO2017143597 | A1 | 8/2017 |
| WO | WO2018024163 | A1 | 2/2018 |
| WO | WO2019153349 | A1 | 8/2019 |

OTHER PUBLICATIONS

European Office Action Corresponding to Application No. 17836345 on Feb. 6, 2024.

European Search Report Corresponding to Application No. 18936977 on Oct. 2, 2024.

K. Amazon: "erenLine Batteriehalter für 3X Mignon AA; geschlossenes Gehäuse mit EIN/Aus-Schalter", Apr. 16, 2016, URL: https://www.amazon.de/Batterichalter-geschlossenes-Aus-Schalter-Batterie-Fach-Batteriekasten/dp/D01EELZ668 (Unable to access URL).

Chinese Office Action corresponding with Application No. 201880089084.7 on Jun. 29, 2022 (1 page).

European Search Report Corresponding with Application No. EP18905235 on Jul. 8, 2021 (1 page).

Chinese Office Action Corresponding with Application No. 201880098353.6 on Jan. 10, 2023 (1 page).

Chinese Office Action Corresponding with Application No. 201880098353.6 on Nov. 20, 2023 (1 page).

* cited by examiner

BATTERY PACKS CONTAINING CONFIGURABLE TERMINAL HOLDER

This application is a National Stage Patent Application of PCT/CN2018/111051, filed on Oct. 19, 2018, the disclosure of which is incorporated by reference herein in its entirety.

FIELD OF INVENTION

This invention relates to an electrical energy storage device, and in particular a battery pack containing multiple battery cells.

BACKGROUND OF INVENTION

Battery packs are commonly used in portable electrical equipment and tools, so that these equipment and tools can be used in environments where no fixed power supply is available. For example, power tools manufacturers often produce a universal power pack which can be compatibly used in different types of cordless power tools, such as electric drills, hammers, screwdrivers, angle grinder, etc. The battery packs usually consist of a plurality of battery cells accommodated in an integral housing where the user can easily install the entire battery into the power tool, or remove it therefrom via latching mechanisms configured on the battery pack housing.

However, traditional battery packs are often manufactured in the factory to a ready-to-use status, which means that the battery pack before leaving the factory for shipping or selling is fully assembled and operational. The end user upon receiving the battery pack may instantly plug the battery pack into an electric device to start using the electric device. The battery packs manufactured in this way no doubt provide convenience to the user as no extra setup step is required on the user's side before starting to use the battery pack. On the other hand, such battery packs suffer from the problem that once it is manufactured in factory, there will be self-discharging of the battery pack, which ultimately leads to energy loss of electrical power n the battery pack, and degrading of battery life.

There have been developed various mechanisms for battery packs which allows the user to manually enable or disable the internal circuit of a battery pack, so that the internal circuit is enabled only when the battery pack is going to be used, i.e. charging the battery pack or use the battery pack in a power tool. One approach is to use a removable connector in the form of a jumper to couple with electrical terminals on the PCB of the battery pack. However, the jumpers in conventional battery packs are easy to be lost because they are light and small. These jumpers are likely to drop out when they are installed on the battery pack. On the other hand, some battery packs use two or more jumpers, including a normal jumper for enabling the internal circuit of the battery pack, and another dummy jumper for isolation/disabling the internal circuit. The use of two jumpers complicates the operation by the user, and also further adds to the likelihood of missing the jumper. In addition, the configuration of a jumper in the battery pack leads to other potential risks. For example, external substance like water is easy to enter into the internal structure of the battery pack and damage the cells or the circuit board of the battery pack.

SUMMARY OF INVENTION

In the light of the foregoing background, it is an object of the present invention to provide an alternate battery pack, as well as methods of manufacturing the battery packs and preparing the battery packs for use, which eliminate or at least alleviates the above technical problems.

The above object is met by the combination of features of the main claim; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

Accordingly, the present invention, in one aspect, is a battery pack containing a housing, and two or more battery cells located in the housing. The two or more battery cells are interconnected by a configurable connector which is configured to enable electrical connections between the two or more battery cells. The configurable connector includes a plurality of first electrical terminals connected to the two or more battery cells, and a terminal holder adapted to be removably connected to the plurality of the first electrical terminals. The terminal holder is adapted to be installed to the housing in a first orientation at which the two or more battery cells are electrically connected, or in a second orientation at which the two or more battery cells are not electrically connected. The terminal holder includes a plurality of second electrical terminals. One of the plurality of the second electrical terminals always engages with a same one of the plurality of the first electrical terminals, when the terminal holder is installed to the housing in the first orientation or the second orientation.

Preferably, the first orientation of the terminal holder and the second orientation of the terminal holder are 180° different from each other.

More preferably, the terminal holder contains three second electrical terminals arranged substantially along a straight line. The configurable connector contains three first electrical terminals. A middle one of the three second electrical terminals always engages with a same one of the first electrical terminals.

According to a variation of the preferred embodiments, the terminal holder further includes multiple sets of the second electrical terminals arranged substantially along a straight line. Within at least one set of the multiple sets of the second electrical terminals, a plurality of the second electrical terminals are arranged along a direction substantially perpendicular to the straight line.

According to another variation of the preferred embodiments, the battery pack further includes a first latch mechanism adapted to lock the terminal holder on the housing.

In one specific implementation, the first latch mechanism includes a locking member pivotally connected to the housing, and the locking member is adapted to cooperate with a corresponding locking feature on the terminal holder to lock the terminal holder on the housing.

Preferably, one end of the locking member is pivotally connected to the housing, and another end of the locking member is adapted to move relative to the housing and removably secured to the housing.

More preferably, the another end of the locking member is adapted to be locked to the housing by snap-fitting.

Additionally or alternatively, the locking member is adapted to pivot within a plane substantially vertical to a direction of installing the terminal holder to the housing. The locking feature of the terminal holder is a groove formed on the terminal holder which is adapted to at least partially accommodate the locking member.

In another specific implementation, the first latch mechanism includes a fastening member movably configured on the terminal holder. The fastening member is adapted to removably engage with a corresponding locking feature on the housing to lock the terminal holder on the housing.

Preferably, the fastening member is adapted to rotate relative to the terminal holder. The fastening member further contains an actuating end and a fastening end.

More preferably, the fastening end of the fastening member is formed with exterior threads. The locking feature on the housing is interior threads formed in a cylindrical hole formed on the housing.

Alternatively, the fastening end of the fastening member has an asymmetrical cross-sectional shape. The locking feature on the housing is a through-hole with corresponding asymmetrical shape to the asymmetrical cross-sectional shape of the fastening end.

Further alternatively, the first latch mechanism includes a resilient member configured on the terminal holder. The resilient member is adapted to engage with a corresponding locking feature on the housing to lock the terminal holder on the housing.

Preferably, the resilient member includes a hook end; the locking feature on the housing contains a catch to which the hook end is adapted to removably engage.

According to another variation of the preferred embodiments, the battery pack further includes a second latch mechanism adapted to lock the battery pack to a power tool or a battery charger.

Preferably, the second latch mechanism further includes a detent movable between a first position at which the detent does not lock the battery pack to the power tool or the battery charger, and a second position at which the detent cooperates with a geometrical feature on the power tool or the battery charger. The detent is connected with a user-actuated member, the movement of which urges the detent to move between the first position and the second position.

More preferably, the detent is connected with the user-actuated member by an intermediate member. The intermediate member is pivotally connected to the housing.

In one specific implementation, the detent, the intermediate member and the user-actuated member are formed integrally as a single-piece.

In another specific implementation, the detent is adapted to move along a direction which is substantially parallel to a longitudinal direction of the user-actuated member when the user-actuated member is not actuated by a user.

In a further specific implementation, the intermediate member is connected by two separate pins to the housing. The pins act as hinges for the intermediate member.

According to another variation of the preferred embodiments, the first electrical terminals and the second electrical terminals are selected from the group consisting of: bent metal plates and metal strips.

According to a further variation of the preferred embodiments, the battery pack further includes a circuit board on which the configurable connector is configured.

Preferably, the circuit board is coated with a waterproof coating.

Additionally or alternatively, the circuit board is configured with a plurality of display elements which are adapted for diagnosis purposes.

According to another variation of the preferred embodiments, for at least one of the two or more battery cells, a gasket is affixed to an electrode thereof. The gasket cooperating with a contact pad soldered to the electrode to provide a waterproof function.

According to another variation of the preferred embodiments, the housing is configured with a sealing member located around an opening of the housing. The opening is adapted to receive an external component which fits with the housing. The sealing member is adapted to seal the opening when the external component is installed to the housing.

Preferably, the sealing member is an O-ring.

More preferably, the sealing member is made of overmold material.

In one specific implementation, the external component is the terminal holder.

According to another aspect of the invention, there is provided a battery pack which contains a housing, and two or more battery cells located in the housing. The two or more battery cells are interconnected by a configurable connector which is configured to enable electrical connections between the two or more battery cells. The configurable connector contains a plurality of first electrical terminals connected to the two or more battery cells, and a terminal holder adapted to be removably connected to the plurality of the first electrical terminals; the terminal holder adapted to be installed to the housing. The battery pack further contains a latching mechanism adapted to lock the terminal holder on the housing.

Preferably, the latch mechanism includes a locking member pivotally connected to the housing. The locking member adapted to cooperate with a corresponding locking feature on the terminal holder to lock the terminal holder on the housing.

More preferably, one end of the locking member is pivotally connected to the housing, and another end of the locking member is adapted to move relative to the housing and removably secured to the housing.

Most preferably, the another end of the locking member is adapted to be locked to the housing by snap-fitting.

According to a variation of the preferred embodiments, the locking member is adapted to pivot within a plane substantially vertical to a direction of installing the terminal holder to the housing. The locking feature of the terminal holder is a groove formed on the terminal holder which is adapted to at least partially accommodate the locking member.

According to another variation of the preferred embodiments, the latch mechanism includes a fastening member movably configured on the terminal holder. The fastening member is adapted to removably engage with a corresponding locking feature on the housing to lock the terminal holder on the housing.

Preferably, the fastening member is adapted to rotate relative to the terminal holder. The fastening member further contains an actuating end and a fastening end.

More preferably, the fastening end of the fastening member is formed with exterior threads. The locking feature on the housing is interior threads formed in a cylindrical hole formed on the housing.

Alternatively, the fastening end of the fastening member has an asymmetrical cross-sectional shape. The locking feature on the housing is a through-hole with corresponding asymmetrical shape to the asymmetrical cross-sectional shape of the fastening end.

Further alternatively, the latch mechanism includes a resilient member configured on the terminal holder. The resilient member is adapted to engage with a corresponding locking feature on the housing to lock the terminal holder on the housing.

Preferably, the resilient member includes a hook end. The locking feature on the housing contains a catch to which the hook end is adapted to removably engage.

According to a third aspect of the invention, there is provided a battery pack which contains a housing, two or more battery cells located in the housing, and a latching mechanism adapted to lock the battery pack to a power tool or a battery charger. The two or more battery cells are interconnected by a configurable connector which is configured to enable electrical connections between the two or more battery cells. The configurable connector contains a plurality of first electrical terminals connected to the two or more battery cells, and a terminal holder adapted to be removably connected to the plurality of the first electrical terminals; the terminal holder adapted to be installed to the housing.

Preferably, the latch mechanism further includes a detent movable between a first position at which the detent does not lock the battery pack to the power tool or the battery charger, and a second position at which the detent cooperates with a geometrical feature on the power tool or the battery charger. The detent is connected with a user-actuated member, the movement of which urges the detent to move between the first position and the second position.

More preferably, the detent is connected with the user-actuated member by an intermediate member. The intermediate member is pivotally connected to the housing.

More preferably, the detent, the intermediate member and the user-actuated member are formed integrally as a single-piece.

According to a variation of the preferred embodiments, the detent is adapted to move along a direction which is substantially parallel to a longitudinal direction of the user-actuated member when the user-actuated member is not actuated by a user.

According to another variation of the preferred embodiments, the intermediate member is connected by two separate pins to the housing. The pins act as hinges for the intermediate member.

According to a fourth aspect of the invention, there is provided a battery pack containing a housing and two or more battery cells located in the housing. The two or more battery cells are interconnected by a configurable connector which is configured to enable electrical connections between the two or more battery cells. The configurable connector contains a plurality of first electrical terminals connected to the two or more battery cells, and a terminal holder adapted to be removably connected to the plurality of the first electrical terminals. The terminal holder is adapted to be installed to the housing in a first orientation at which the two or more battery cells are electrically connected, or in a second orientation at which the two or more battery cells are not electrically connected. The housing is configured with a sealing member located around an opening of the housing; the opening adapted to receive an external component which fits with the housing; the sealing member adapted to seal the opening when the external component is installed to the housing.

Preferably, the sealing member is an O-ring.

More preferably, the sealing member is made of overmold material.

In one specific implementation, the external component is the terminal holder.

There are many advantages to the present invention. According to some embodiments of the invention, only a single terminal holder is required for use with the battery pack. To configure the battery pack in different status, the user only needs to insert the terminal holder in one of the two possible orientations. Therefore, it is very intuitive for the user to use the terminal holder to setup the battery pack, without having to worry about inserting a wrong terminal holder or misplaced it. As only one terminal holder is required, the likelihood of the terminal holder being lost is greatly reduced. In each orientation of the terminal holder being installed, the terminal holder completely complements the opening on the housing of the battery pack for the terminal holder, so and the appearance of the battery pack always looks the same.

Also, according to some embodiments of the invention, there is a first latch mechanism for the terminal holder configured on the battery pack. The first latch mechanism for example can be in the form of a clamp, a screw, or a shape-fitting lock, but no matter in which form the latch mechanism helps secure the terminal holder to the housing of the battery pack that unless the user intentionally removes the terminal holder by releasing the latch system, the terminal holder will not accidentally drop out from the housing of the battery pack during operation of an electric tool, or during storing and transportation of the battery pack. This further reduces the chance that the terminal holder is lost.

A further advantage of the present invention is that according to some embodiments of the invention, the battery pack is design to be waterproof, as most if not all of the joints between the two housing members and also between a housing member and other components like the terminal holder are sealed using various sealing members. In this way, even if the terminal holder requires an opening on the housing of the battery pack for accessing the PCB of the battery pack, there is minimized the risk of water dropping into the PCB or the battery cells.

BRIEF DESCRIPTION OF FIGURES

In the drawings, like numerals indicate like parts throughout the several embodiments described herein.

DETAILED DESCRIPTION OF THE PREFERRED EMBODIMENTS

In the claims which follow and in the preceding description of the invention, except where the context requires otherwise due to express language or necessary implication, the word “comprise” or variations such as “comprises” or “comprising” is used in an inclusive sense, i.e. to specify the presence of the stated features but not to preclude the presence or addition of further features in various embodiments of the invention.

As used herein and in the claims, “couple” or “connect” refers to electrical coupling or connection either directly or indirectly via one or more electrical means unless otherwise stated.

Terms such as “horizontal”, “vertical”, “upwards”, “downwards”, “above”, “below” and similar terms as used herein are for the purpose of describing the invention in its normal in-use orientation and are not intended to limit the invention to any particular orientation.

Referring now to FIGS. 1-4, the first embodiment of the present invention is a battery pack which can be used in electric appliances such as electric tools. The battery pack contains a housing 20 consists of a first housing member 20*a* and a second housing member 20*b* which are assembled together to define an internal space (not shown) of the battery pack. The internal space accommodates internal components of the battery pack including but not limited to a plurality of battery cells 42, one or more battery frames 40 supporting these battery cells 42, and a control circuit board 38 of the battery pack. The housing 20 exhibits a special shape which is made in accordance with the dimension of the battery receptacle (not shown) on the aforementioned electric appliances or chargers for the battery pack, as those skilled in the art would understand.

Figure 1:
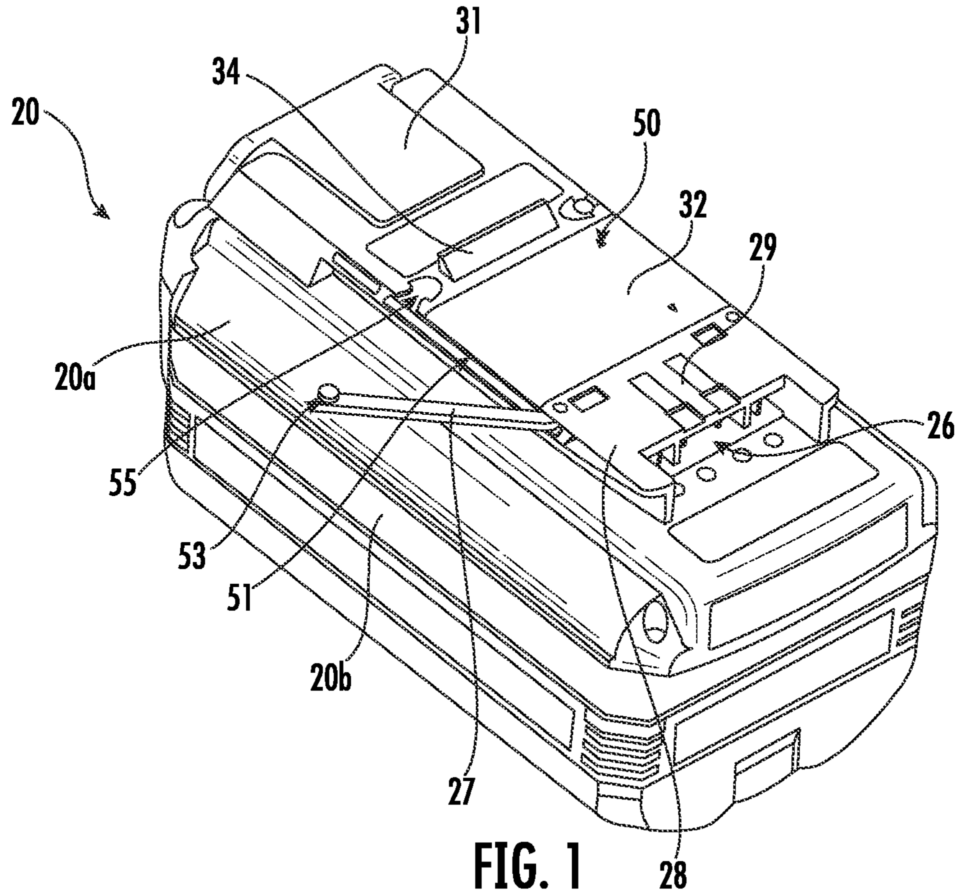
FIG. 1 shows the overall appearance of a battery pack according to a first embodiment of the present invention.

FIG. 1 in particular shows the bottom side of the battery pack, where battery pins 26 and two latching mechanism of the battery pack are shown. The first latching mechanism is used to removably secure a terminal holder 32 for the battery pack to the housing 20. The second latching mechanism is used for fixing the battery pack in the battery receptacle of external electric tools or battery chargers (not shown). Both the first and second latching mechanisms will be described in more details later. The battery pins 26 are concealed under a protruded part 28 of the housing 20, so that the battery pins 26 can only be physically contacted by corresponding terminals (not shown) on the charger or the electric tool when the battery pack is inserted into the battery receptacle of the electric tool or the charger. On the protruded part 28 and in particular above the battery pins 26 there are also secondary pins 29. The secondary pins 29 are assembled together with some of the battery pins 26 which will be described in more details later.

Figure 3:
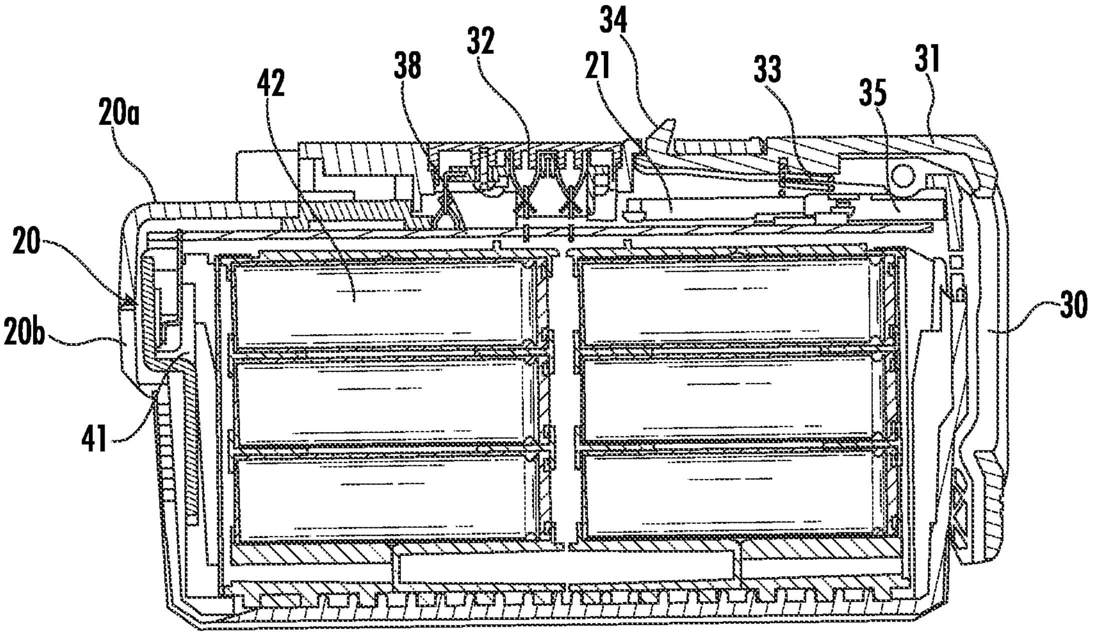
FIG. 3 shows another cross-sectional view of the battery pack in FIG. 1 along a vertical plane parallel to the longitudinal direction of the battery pack and which across the center of the battery pack.

The second latch mechanism includes an unlocking lever formed with a user-actuated member 30 (see FIG. 3) on its one end and a detent 34 on its other end. The user-actuated member 30 and the detent 34 are connected by an intermediate member 31, and all three are formed as a single-piece integrally. The unlocking lever is normally biased by a resilient means, and in particular a spring 33 connected between the unlocking lever and a latch cover 21 so that the detent 34 is normally extending beyond the surface of the protruded part 28 when there is no user intervention. At this moment the detent 34 is at a second position that the detent 34 is able to lock the battery pack to external electrical appliances or chargers by the detent 34 engaging with corresponding geometrical feature (e.g. a catch) on external electrical appliances or chargers. The latch cover 21 is fixed to the housing 20. The spring 33 has its one end connected to the intermediate member 31 and its other end connected to the latch cover 21. The unlocking lever is also connected to the housing 20 by a hinge 35 which functions as a fulcrum for the unlocking lever to pivotally move relative to the housing 20. Each hinge 35 is formed by a pin. The hinge 35 connects to the intermediate member 31 where the latter is pivotally connected to the housing 20. If the user lifts up the user actuated-member 30 from the position shown in FIG. 3, then due to the lever effect the detent 34 moves downwardly into the protruded part 28. The detent 34 then moves to its second position at which the detent 34 does not lock the battery pack to the external electrical appliances or chargers. The movement direction of the detent 34 is parallel to the longitudinal direction of the user-actuated member 30 when it is not operated by the user as shown in FIG. 3.

Figure 5:
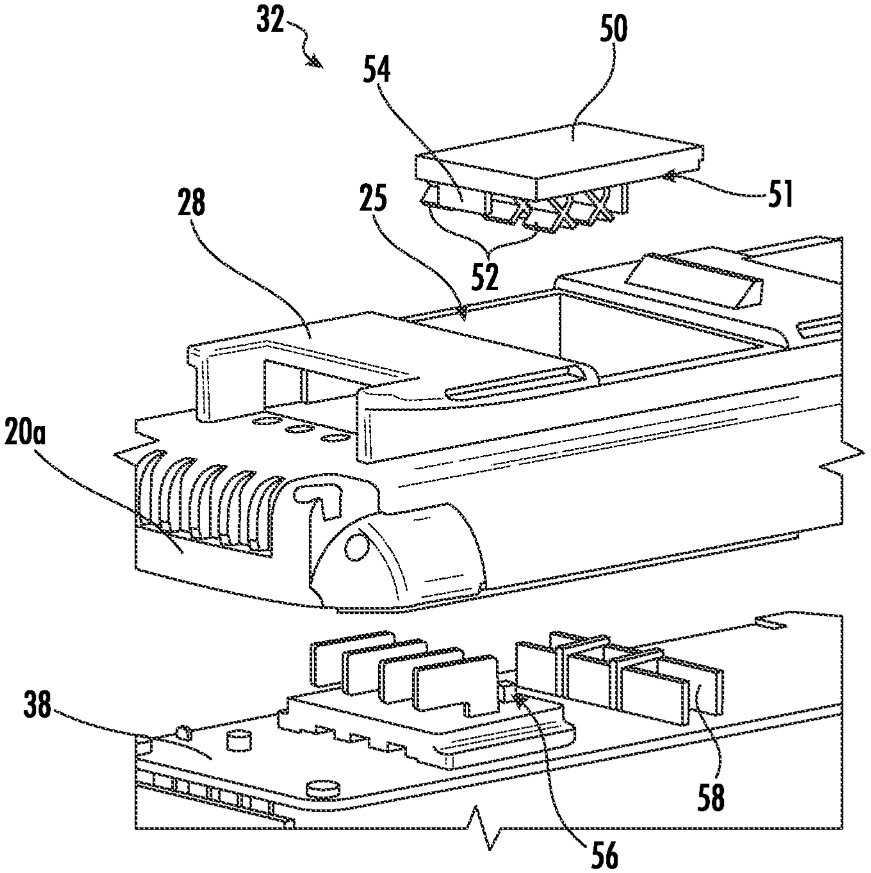
FIG. 5 shows an perspective view of the circuit board, the first housing member and the terminal holder of the battery pack in FIGS. 1-4 which are separated from each other.
Figure 6A:
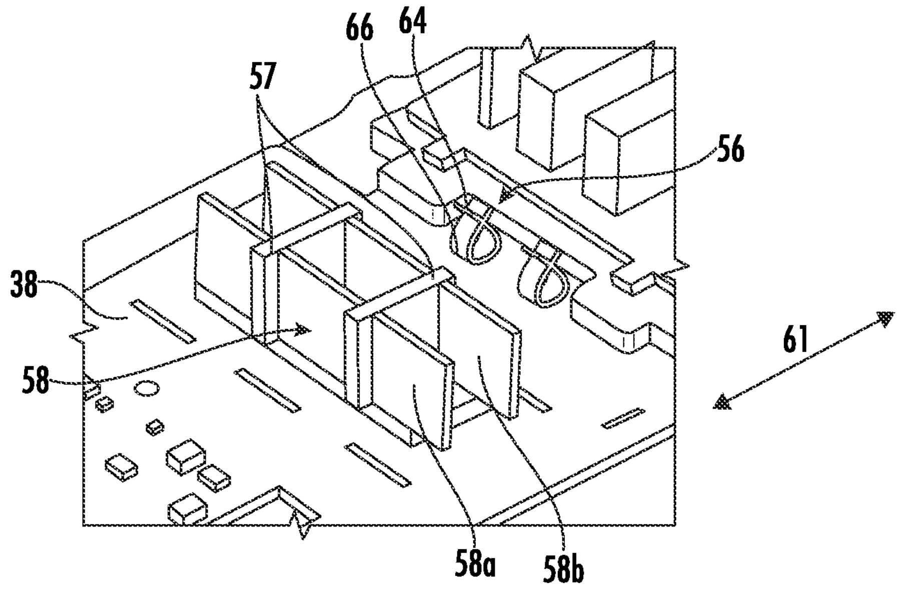
FIG. 6*a* shows the metal pins configured on the circuit board of the battery pack in FIGS. 1-4.
Figure 6B:
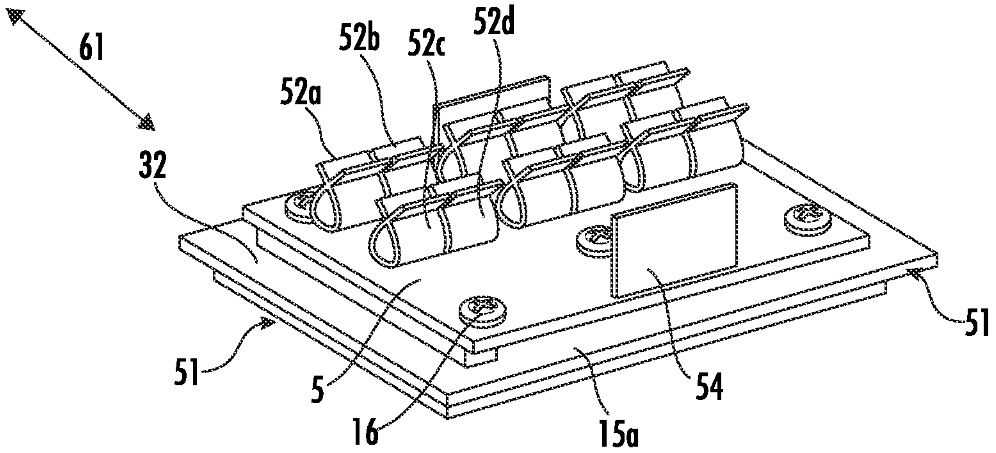
FIG. 6*b* shows the back side of the terminal holder of the battery pack in FIGS. 1-4 where multiple metal clips are shown.
Figure 15:
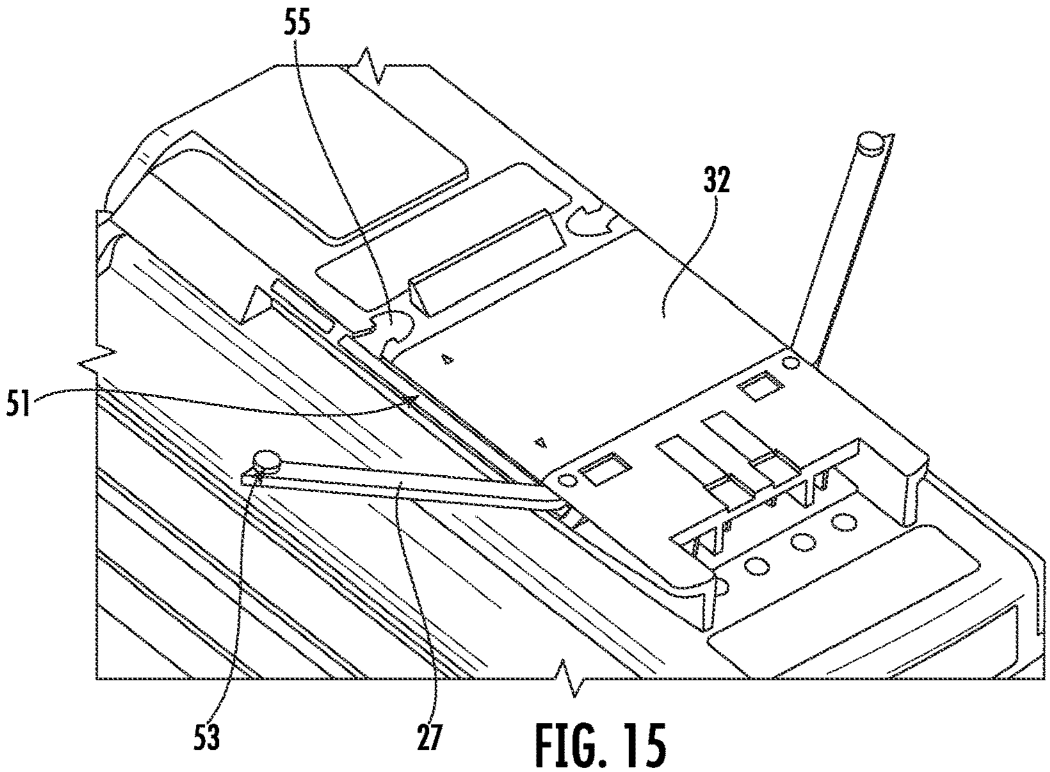
FIG. 15 shows the terminal holder of the battery pack of FIGS. 1-4 installed to the battery housing but with the pivotable arms open.

The first latch mechanism includes a pair of pivotably installed arms 27 on the housing 20 which can be used to lock the terminal holder 32. Note that only one such arm 27 is shown in FIG. 1. The arms 27 as locking members are adapted to engage with corresponding locking features on the terminal holder. The locking features are grooves 51 formed along two edges of the end plate 50 of the terminal holder 32, as best illustrated in FIGS. 5 and 6*b*. When the terminal holder 32 is installed to the battery pack, at least a part of the arm 27 would be accommodated within a corresponding groove 51, thereby locking the terminal holder 32 and preventing it from dropping out from the battery pack. One end of the arm 27 is formed with a round-shaped protrusion 53 which is adapted to snap-fit with a corresponding round-shaped recess 55 on the protruded part 28 of the housing 20. The round-shaped recess 55 has an entrance which has a width slightly smaller than that the diameter of the round-shaped protrusion 53. One or both of the arm 27 and the protruded part 28 are made from flexible materials such as Polyvinylchloride (PVC), so that the round-shaped protrusion 53 and/or the material forming round-shaped recess 55 is deformable to allow the round-shaped protrusion 53 entering into the round-shaped recess 55 through the entrance, but not easily escaping the round-shaped recess 55 unless actuated by the user. In this way, the movable end of the arm 27 which is the end with the round-shaped protrusion 53 can be locked to the housing by snap-fitting, and can be removably secured to the housing 20. Another end of the arm 27 is pivotally connected to the protruded part 28 and is thus a fixed end. The arms 27 are adapted to pivot within a plane substantially vertical to a direction of installing the terminal holder to the housing. The plane is parallel to the plane in which an end plate 50 of the terminal holder is located when it is installed to the housing 20, as shown in FIG. 15.

Figure 2:
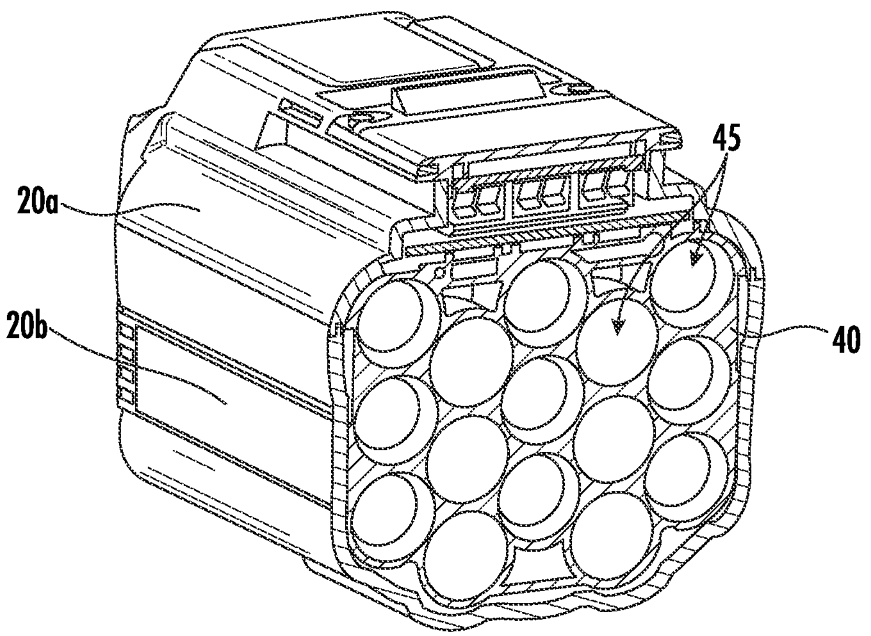
FIG. 2 shows a cross-sectional view of the battery pack in FIG. 1 along a vertical plane perpendicular to and at a middle point of the longitudinal direction of the battery pack.
Figure 7:
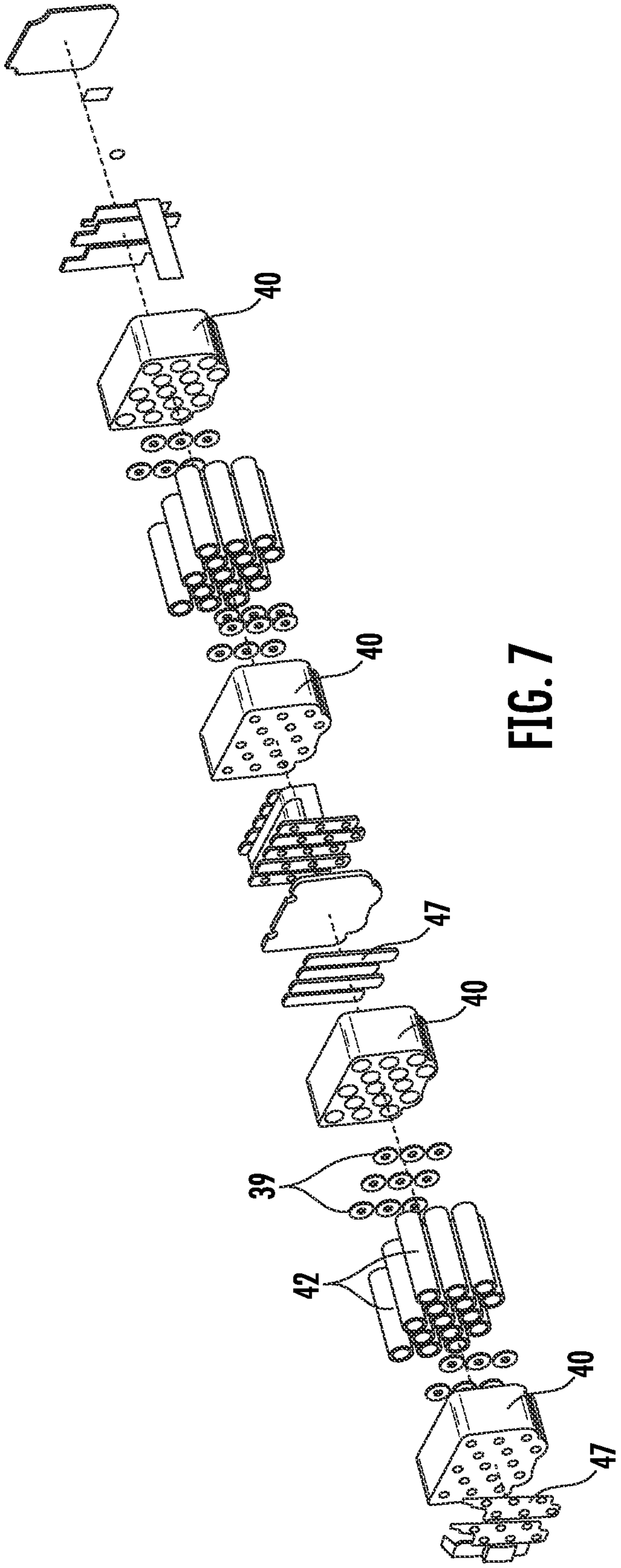
FIG. 7 is an exploded view of the battery cells and other supporting structures of the battery cells of the battery pack in FIGS. 1-4, without the housing members or the circuit board.
Figure 8A:
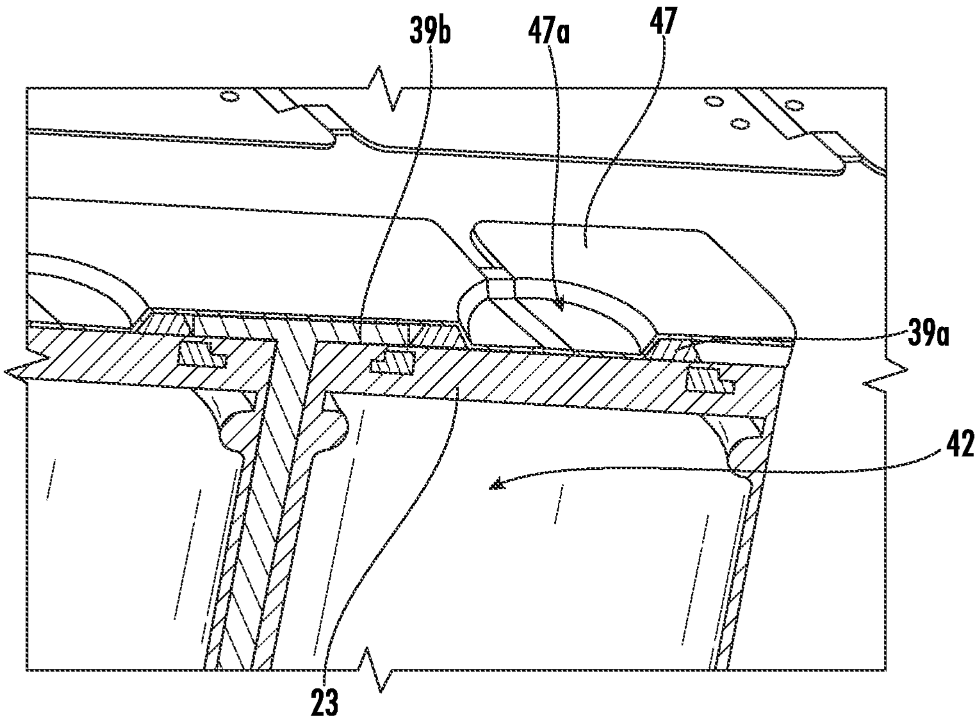
FIGS. 8*a* and 8*b* show from different viewing angles a battery cell of the battery pack in FIGS. 1-4 with a contact pad and a gasket soldered to a terminal of the battery cell.
Figure 8B:
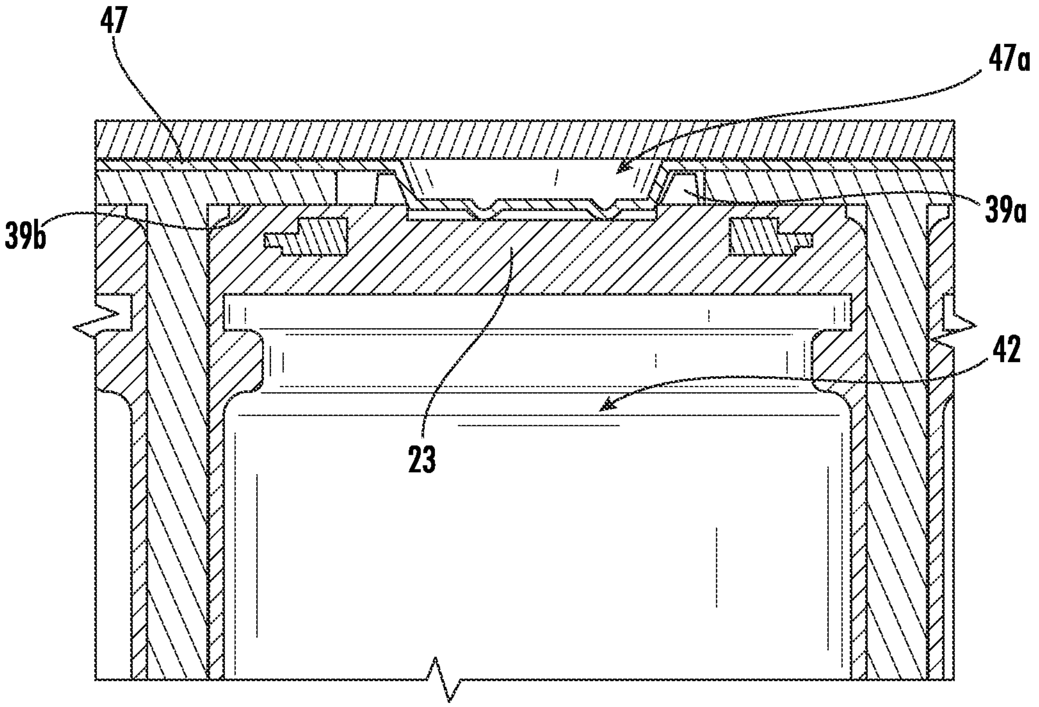

As best shown in FIG. 7, there are four frames 40 in the battery pack to which the individual battery cells 42 are installed. The four frames 40 are align substantially in a head-to-tail manner which together forms an elongated shape of the battery pack. Each frame 40 contains a plurality of thorough holes 45 where each such thorough hole 45 is used to accommodate one battery cell 42. The battery cell 42 has a cylindrical shape, and they are all aligned along a same direction as shown in FIG. 2. Multiple battery cells 42 in the same frame 40 are connected by metal strips (not shown in FIGS. 1-4) so as to connect the battery cells 42 in parallel. In addition, battery cells 42 across different frames 40 are connected by connecting bars 48 which extend along the exterior surface of the frames 40. The connecting bars 48 are made of thin metal strips, which have shapes closely fitting the exterior shape of the portions of frames 40 along which the connecting bar 48 extends. Each connecting bar 48 extends from an end of a frame 40 to the circuit board 38, where the battery cells 42 in different frames 40 are electrically connected to each other at the circuit board 38, subject to the status of a configurable connector which will be described in details later. One will see that at least some of the connecting bars 48 have a bent shape.

Figure 4:
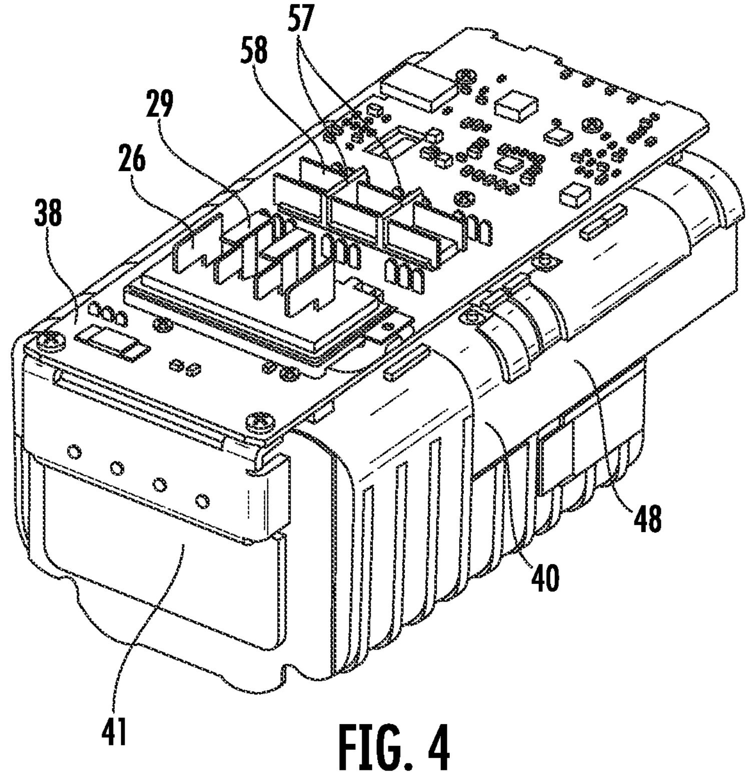
FIG. 4 is a perspective view of the internal components of the battery pack with the housing members removed.

The aforementioned battery pins 26 are placed on the circuit board 38 and electrically connected to the circuit board 38. Among the four battery pins 26, there is a positive pin, a negative pin, a first signal pin, and a second signal pin. As shown in FIG. 4, the secondary pins 29 are integrated with two of the battery pins 26, and in particular the secondary pins 29 are formed above the first and second signal pins among the battery pins 26. The secondary pins 29 are each formed in a L-shape (not shown) so that they extend firstly from the circuit board 38 upwardly and then extend forwardly to be positioned above the corresponding battery pins 26. In this way multiple signal pins for the battery pack can be configured within a relatively tight space. Next to the battery pins 26, also configured on the circuit board 38 are metal strips 58 intended for connecting with corresponding terminals on the terminal holder 32. The metal strips 58 are also referred to as first electrical terminals in this embodiment, while corresponding terminals on the terminal holder 32 are referred to as second electrical terminals. The metal strips 58 together with the terminal holder 32 form the configurable connector of the battery pack in this embodiment, and is used to interconnect battery cells 42 of the battery pack. As shown in FIG. 4 there are six metal strips 58 which are separated into two rows. Within each row, the three metal strips 58 are separated and isolated by two ribs 57, the ribs 57 made of non-conducting materials.

At one end of the assembly formed by the multiple frames 40, there is a heat sink 41 connected to the circuit board 38 and which extends substantially perpendicularly with respect to the circuit board 38. The heat sink 41 is made from good heat conducting materials such as copper or aluminum. The heat sink 41 also contacts with metal strips of battery cells 42 of the adjacent frame 40 so that not only heats generated by the circuit board 38, but some heat generated by battery cells 42 may also be dissipated by the heat sink 41.

In FIGS. 1 and 3 the terminal holder 32 is shown to be installed to the protruded part 28 of the housing 20. The terminal holder 32 is used to enable/disable the internal electrical circuit of the battery pack, and is part of the configurable connector of the battery pack as mentioned above. The electrical connection of the terminal holder 32 to other components of the battery pack will be introduced in more details later. The end plate 50 of the terminal holder 32 when installed in the battery pack is flush with the surface of the protruded part 28 of the housing 20. Also, the terminal holder 32 is made a separate piece from the battery pack housing 20 so that the terminal holder 32 can be removed from the battery pack housing 20.

FIG. 5 shows the terminal holder 32 removed from the protruded part 28 of the housing 20, and that an opening 25 on the protruded part 28 which would have been occupied by the terminal holder 32 is revealed. The configurable connector can be switched between a first status and a second status, which ultimately controls electrical connections between the different battery cells 42. The first status is when the configurable connector is switched on, and the second status is when the configurable connector is switched off. The structure of the terminal holder 32 and the configurable connector will now be described. The terminal holder 32 has an end plate 50 as mentioned above, the top surface of which is designed to be flush with the exterior shape of the battery housing 20 in order to form a smooth appearance. On the other side of the end plate 50, there are arranged three sets of metal clips 52, as well as a single metal plate 54. Within each set of metal clips 52, the metal clips 52 are electrically connected. Correspondingly, on the circuit board 38, there are also three sets of metal pins 58 as mentioned previously which correspond to the three sets of metal clips 52. There are also two metal clips 56 on the circuit board 38 corresponding to the single metal plate 54 (only one metal clip 56 is shown in FIG. 5.

FIG. **6*a* shows best how the three sets of metal pins 58 and the two metal clips 56 are arranged on the circuit board 38. Each set includes two metal pins 58 that are normally not electrically connected unless the terminal holder 32 is installed to the battery pack in the first status. For example, the metal pins 58*a* and 58*b* belongs to a same switch in the internal electric circuit of the battery pack, but they are not electrically connected if no terminal holder 32 is installed to the battery pack. The three sets of metal pins 58 each contain two metal pins 58, and these two metal pins 58 are separately arranged in two rows along a straight line indicated by part number 61. The straight line 61 also indicates two opposite orientations that are apart from each other by 180 degrees, and that the terminal holder 32 is adapted to be installed along either one of the two orientations to the battery pack. In each row of the metal pins 58, only one of the two metal pins 58 in a set is present. In other words, the two rows of the metal pins 58 are normally not electrically connected to each other unless the terminal holder 32 is installed to the battery pack in the first status. In each row of the metal pins 58, the three metal pins 58 separated by the ribs 57 are aligned along direction perpendicular to the straight line 61, and these three metal pins 58 belongs to different switches in the internal electric circuit of the battery pack, as will be described in more details later. The different switches together form the configurable connector as mentioned above. On the other hand, each metal clip 56 contains two oppositely arranged bent metal plates. Each metal plate contains a bent end 64 and a flat end 66. The bent end 64 of the metal clip 56 is used for physically contacting with the single metal plate 54 on the terminal holder 32, and since the metal clip 56 is made of thin metal and is thus flexible, the two bent ends 64 of the metal clip 56 allows the single metal plate 54 to squeeze therebetween but not easily falls out without applying an external force on the single metal plate 54. Both metal plates of the metal clip 56 extend upwardly from the circuit board 38 in such a way that metal clip 56 consists of the two metal plates exhibits a substantial X shape. The metal clips 56 are generally located away from the metal pins 58 along the straight line 61, but they are separated from each other along a direction perpendicular to the straight line 61**.

Correspondingly, FIG. **6*b* shows the back side of the terminal holder 32 and how the three sets of metal clips 52 and the metal plate 54 are arranged. Each metal clip 52 has a structure and a shape similar to that of the metal clip 56 mentioned above. Each set of the metal clips 52 includes four metal clips 52, and the four metal clips 52 are divided into two rows, with two metal clips 52 in each row. The two rows of metal clips 52 are separated from each other along the same straight line 61 as described above and shown in FIG. 6*b*. Within each row, the metal clips 52 are aligned along a direction perpendicular to the straight line 61. For example. FIG. 6*b* shows for one set of the metal clips 52 four individual metal clips 52*a*, 52*b*, 52*c* and 52*d*. The metal clips 52*a* and 52*b* are in a same row, and the metal clips 52*c* and 52*d* are in another row. All of the four metal clips 52*a*, 52*b*, 52*c* and 52*d* are electrically connected with each other as mentioned above by a Printed Circuit Board (PCB) 5 that is fixed to the terminal holder 32 by multiple screws 16, but the four metal clips 52*a*, 52*b*, 52*c* and 52*d* are isolated from other metal clips 52 in other sets. The metal plate 54 is generally located away from the metal clips 52 along the straight line 61, but the metal plate 54 extends along a direction perpendicular to the straight line 61**.

FIGS. 7-12 show additional aspects of the battery pack in FIGS. 1-4. The battery pack contains waterproof structures which eliminates or at least reduces the chance that water or other types of liquid enters the internal space of the battery pack to damage the circuit board 38 or the battery cells 42. The battery cells are accommodated in the battery frames 40 as mentioned previously. Multiple battery cells 42 in a battery frame 40 are connected in parallel by metal strips 47 which connect to positive terminals and negative terminals of the battery cells 42. Notably, there are also gaskets 39 connected to positive terminals and negative terminals of one or more of the battery cells 42. Each gasket 39 preferably has a thickness of 0.1 mm. FIGS. **8*a*8-8*b* show in more details how a gasket is connected to terminals of the battery cell 42. The gasket 39 has a substantially annual shape with a collar part 39*a* and an annual part 39*b*. The collar part 39*a* extends perpendicularly from the inner circumference of the annual part 39*b* to enclose a contact pad 47*a* which is soldered to electrodes of the battery cells 42 which are battery terminal 23. The contact pad 47*a* is a part of the metal strip 47. The collar part 39*a* extends all the way to contact the metal strip 47. On the other hand, the annual part 39*b* substantially covers the end face of the battery cell 42. In this way, the gasket 39 seals the contact pad 47*a* and the battery terminal 23 and prevents any liquid from entering the battery terminal 23 or into the interior of the battery cell 42 through the battery terminal 23**.

In addition, although not shown in the drawings, the circuit board 38 as well as other electrical components like connecting bars 48 and metal strips between battery cells 42 are coated with a waterproof coating when they are manufactured in the factory. For example, such coatings may be applied by soaking the relevant components inside a coating basin. By applying the coatings to the components they can resist water or other liquid from corrosion or short-circuit.

Figure 9A:
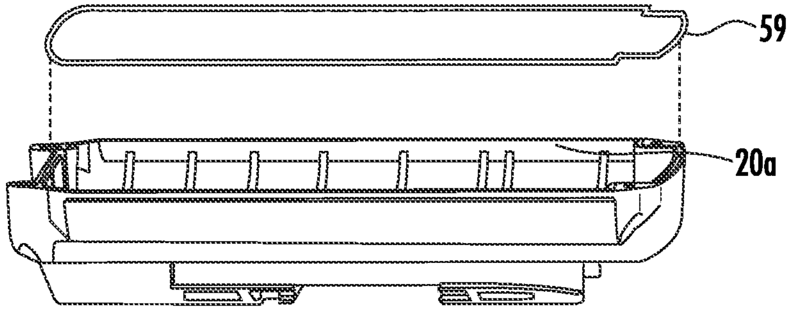
FIG. 9*a* shows an O-ring for a first housing member as a sealing member of the battery pack in FIGS. 1-4.
Figure 9B:
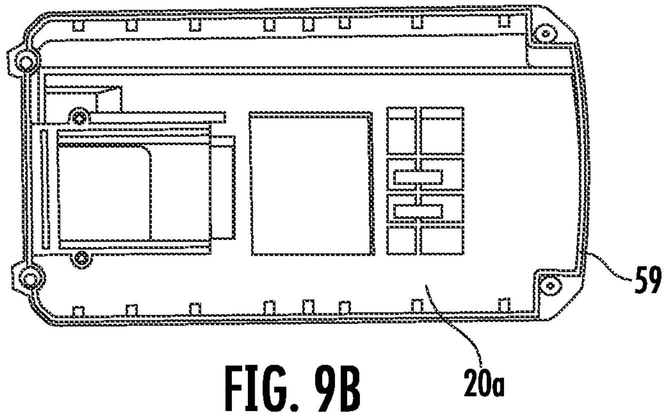
FIG. 9*b* shows the assembled status of the O-ring on the first housing member in FIG. 9*a*.
Figure 9C:
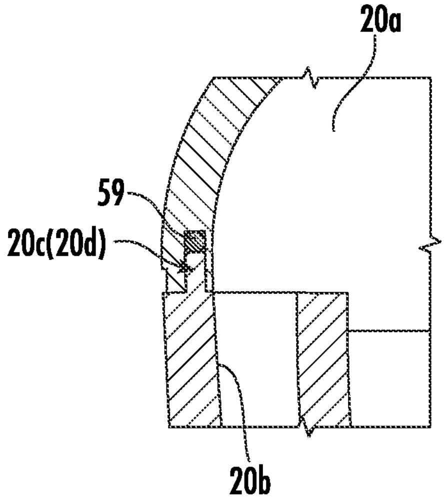
FIG. 9*c* is a cross-sectional view showing the assembled status of the two housing members with the O-ring of FIG. 9*a* fitted therebetween.

Turning now to FIGS. **9*a*-9*c*, the battery pack of FIGS. 1-4 contains another waterproof configuration which involves an O-ring 59 as a sealing member. The O-ring 59** has a shape substantially corresponding to a cross-sectional shape of the first housing member 20*a*. The first housing member 20*a* is formed with a groove 20*c* at its perimeter in which the O-ring 59 is received. In other words, the O-ring 59 is located around an opening of the first housing member 20*a*, the opening receiving the second housing member 20*b* as an external component which fits with the first housing member 20*a*. The second housing member 20*b* is formed with a protrusion 20*d* at its perimeter which is complemental to the groove 20*c* of the first housing member 20*a*. As shown in FIG. 9*c*, once the first housing member 20*a* and the second housing member 20*b* are assembled together, the O-ring 59 is pressed tight between the protrusion 20*d* and the protrusion 20*d* and thus O-ring 59 would prevent any liquid from entering the interior of the battery pack through the gap between the first housing member 20*a* and the second housing member 20*b*. As such, the O-ring 59 seals the first housing member 20*a* when the second housing 20*b* is installed to the first housing member 20*a*.

Figure 10A:
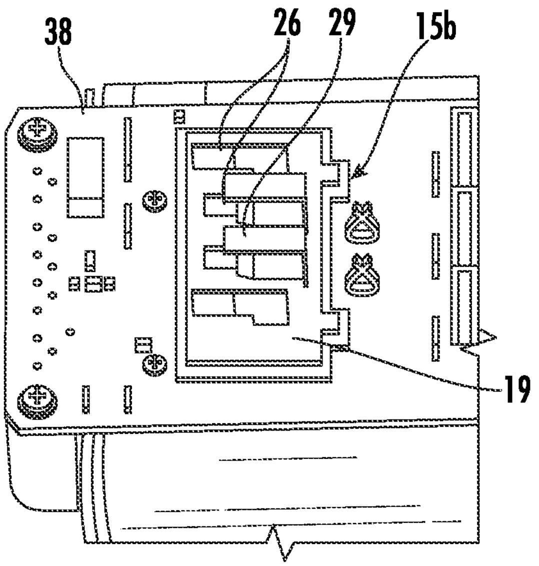
FIG. 10*a* shows an overmold plastic surrounding a terminal plate on the circuit board of the battery pack in FIGS. 1-4.
Figure 10B:
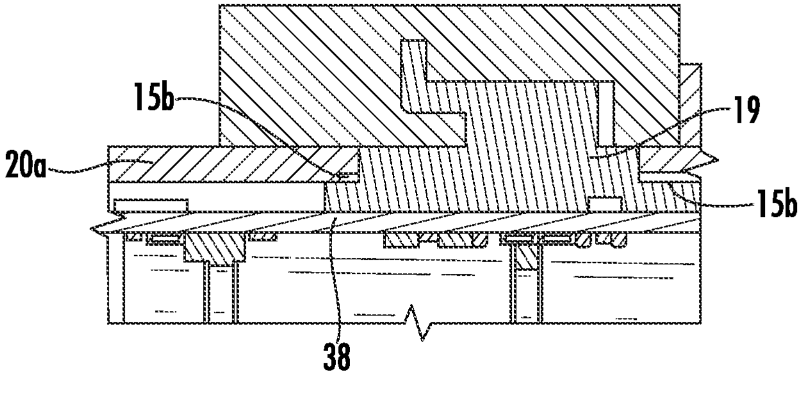
FIG. 10*b* is a cross-sectional view shows in the overmold plastic in FIG. 10*a*.

In FIGS. 10*a*-11*d*, there is shown another waterproof configuration for the battery pack of FIGS. 1-4, which uses overmold plastic as a sealing material. The overmold plastic can be made in different shapes to seal different openings existed in the battery pack that are adapted to receive another component or being exposed to the exterior environment. In FIGS. 10*a* and 10*b*, a loop 15*b* of overmold plastic surrounds a terminal plate 19 on which the aforementioned metal pins 26 as well as the secondary pins 29 are configured. The loop 15*b* is formed in a shape closely following that of the terminal plate 19 which is mounted on the circuit board 38. When the circuit board 38 is installed to the housing of the battery, and in particular the first housing member 20*a*, then the loop 15*b* effectively occupies a gap existed between the edge of the terminal plate 19 and the first housing member 20*a*. The gap is exposed to the exterior environment because the terminal plate 19 and the metal pins 26 as well as the secondary pins 29 must be exposed in order for the battery pack to connect to electrical appliances or chargers. The loop 15*b* would thus prevent any liquid from entering the interior of the battery pack through the gap between the first housing member 20*a* and the terminal plate 19.

Figure 11A:
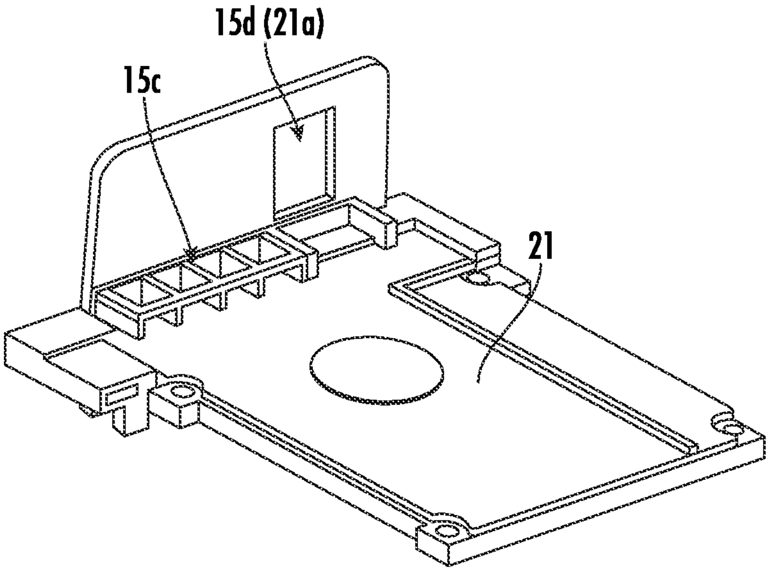
FIG. 11*a* shows separately a latch cover of the battery pack in FIGS. 1-4 which contains overmold plastics as sealing members.
Figure 11B:
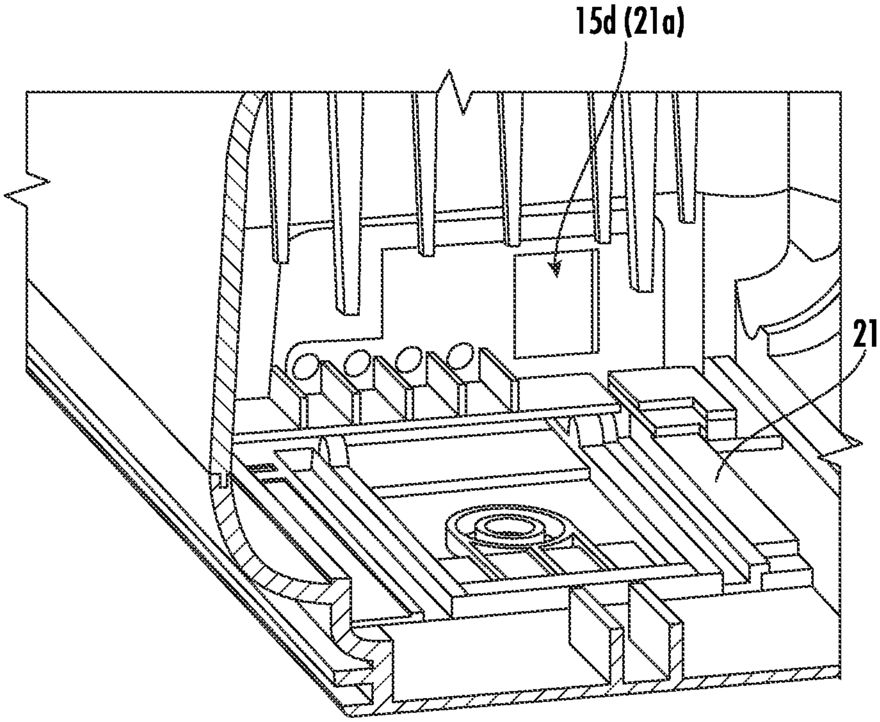
FIG. 11*b* shows the latch cover of FIG. 11*a* in a different viewing angle and also in the battery housing.
Figure 11C:
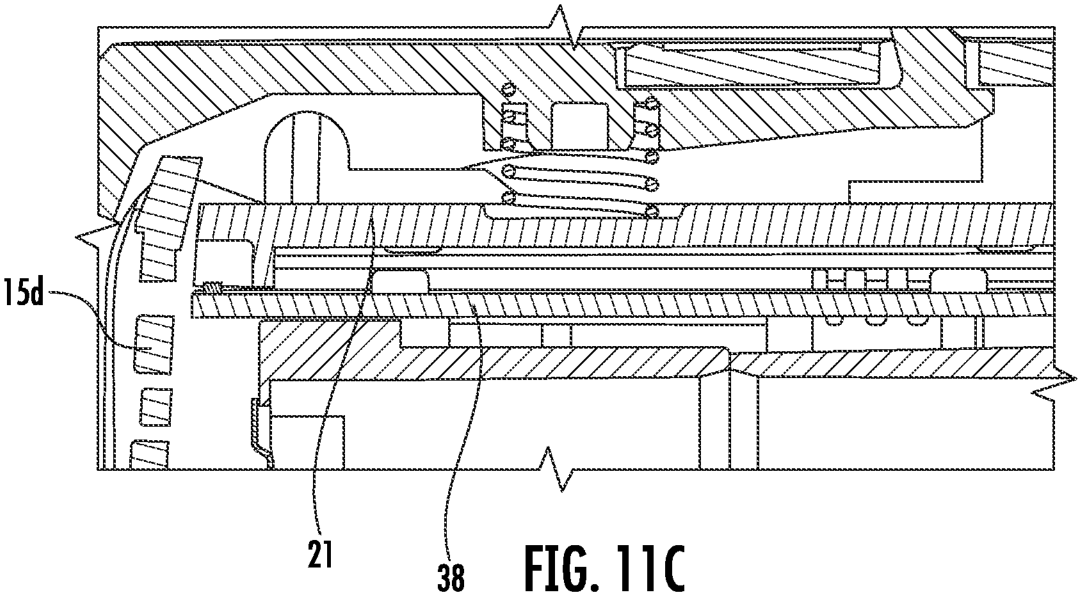
FIG. 11*c* shows a overmold plastic configured at the fuel gauge of the battery pack in FIGS. 1-4.

FIGS. 11*a*-11*c* show waterproof configurations on the latch cover 21 which supports the unlocking lever as mentioned above. The latch cover 21 is supported on the circuit board 38. There are rectangular shaped overmold plastics 15*c* configured around corresponding rectangular shaped structures on the latch cover 21. Also, there is a window 21*a* for the battery power level display (not shown) formed on the latch cover 21, and this is also sealed by an overmold plastic piece 15*d*.

Figure 11D:
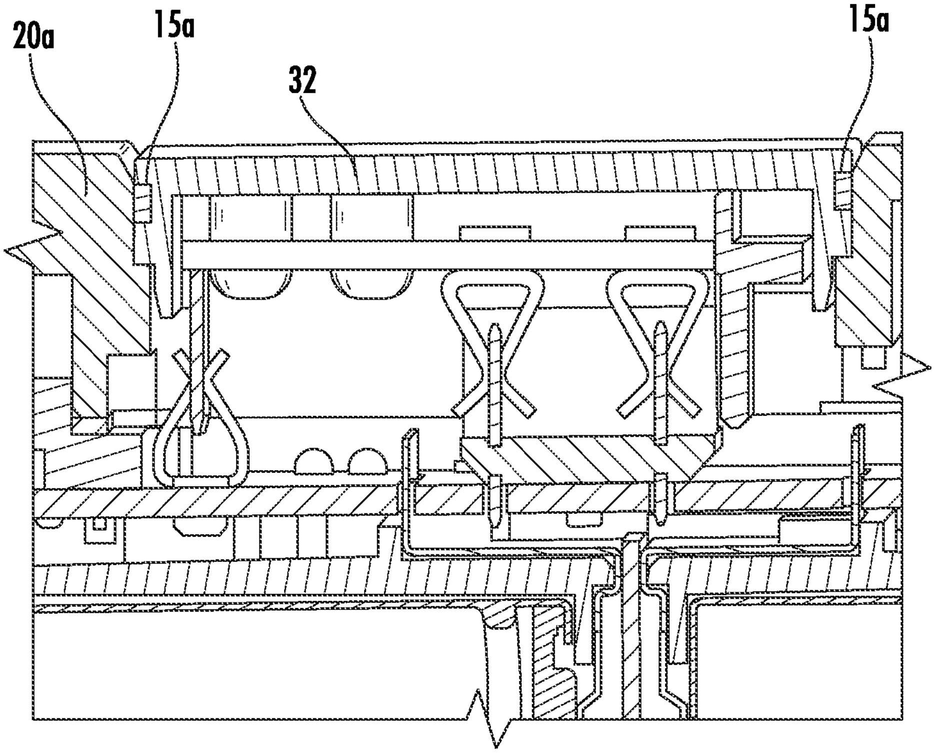
FIG. 11*d* shows overmold plastics on terminal holder of the battery pack in FIGS. 1-4 when the terminal holder is installed to the housing of the battery pack.

FIGS. 11*d* and 6*b* shows overmold plastic strips 15*a* which are arranged on two edges of 550 the terminal holder 32. Such overmold plastic strips 15*a* when the terminal holder 32 is inserted into the opening 25 formed on the first housing member 20*a* would snap-fit between the edges of the terminal holder 32 and that of the first housing member 20*a*. Therefore, the overmold plastic strips 15*a* would prevent any liquid from entering the interior of the battery pack through the gap between the first housing member 20*a* and the terminal holder 32. Note that as there are two overmold plastic strips 15*a* on two edges of the terminal holder 32, no matter along which direction the terminal holder 32 is inserted, the overmold plastic strips 15*a* always exert their sealing functions.

Now turning to the manufacturing and assembling methods of the battery pack described above, FIGS. 12*a* and 12*b* show how the terminal holder 32 can be installed to the battery pack along two different orientations, the two orientations being 180 degrees apart from each other. By utilizing a removable terminal holder 32 as a part of the configurable connector of the battery pack, the battery pack according to this embodiment may be manufactured in factory prior to shipping and delivering to the end user. Once the battery pack manufactured, it is not ready for normal operation yet since the configurable connector are not in a switched-on status when the terminal holder 32 is at an OFF position. The battery pack only becomes operable when the user changes the terminal holder 32 to an ON position, thus switches on the configurable connector. When the end user purchased or otherwise received the battery pack, he/she only has to perform a simple setup process to make the battery pack operational.

Figure 12A:
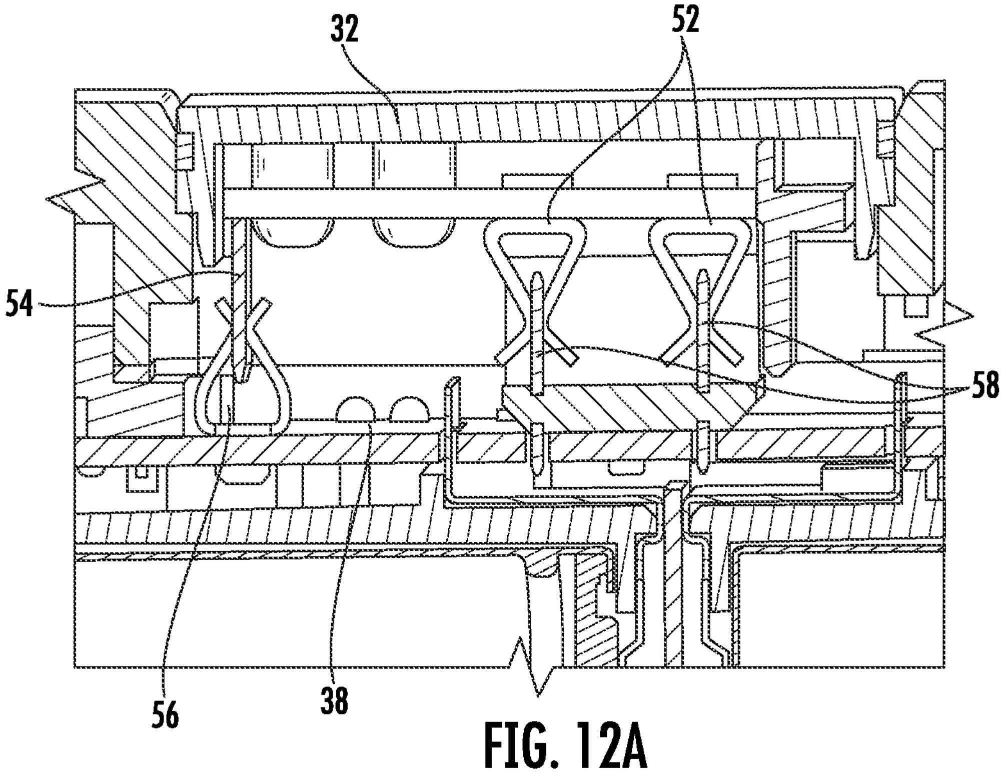
FIGS. 12*a* and 12*b* are cross-sectional views showing the connections of the terminal holder in the battery pack of FIGS. 1-4 to the electrical terminals on the circuit board when the terminal holder is at its ON position and OFF position respectively.
Figure 12B:
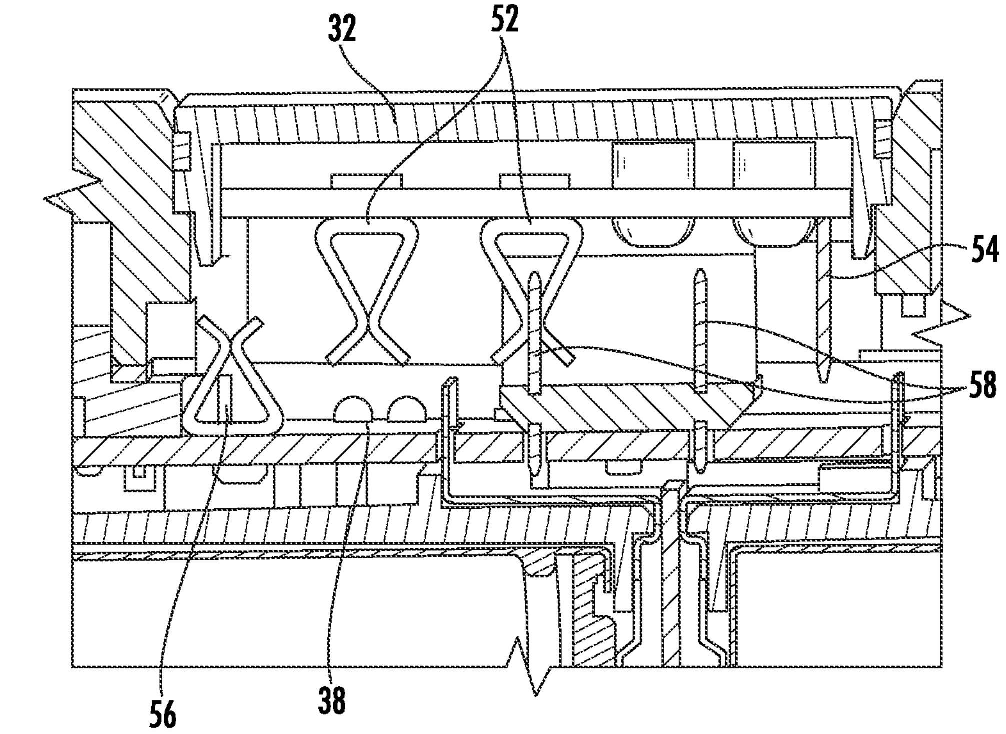
Figure 14A:
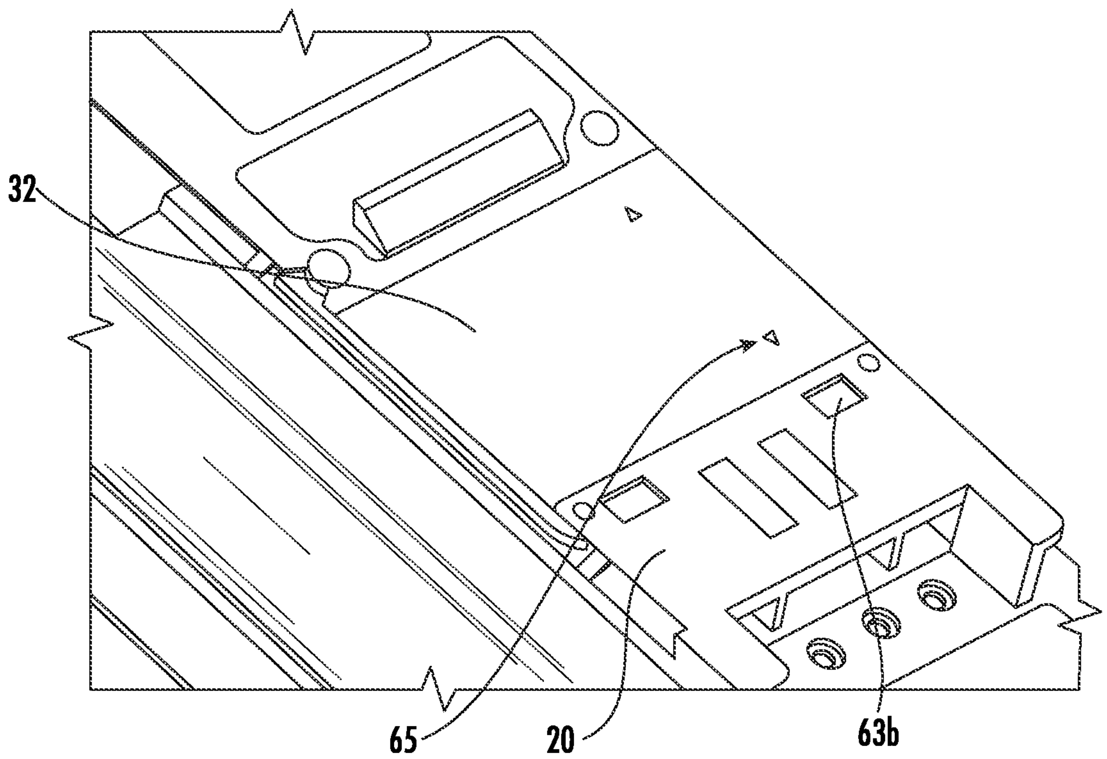
FIGS. 14*a* and 14*b* illustrate the appearance of the battery pack of FIGS. 1-4 when the terminal holder is installed to its ON position and OFF position respectively.
Figure 14B:
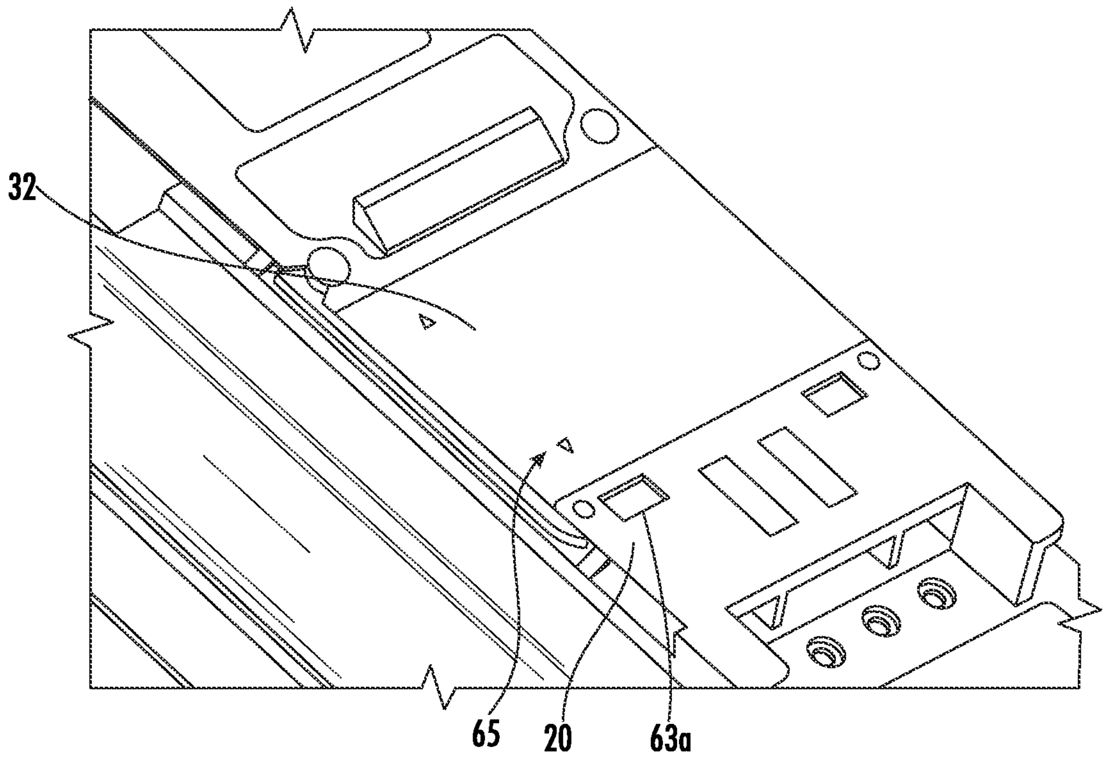

FIG. 12*b* shows the status of the terminal holder 32 at its OFF position, which is the position the terminal holder 32 is at when the battery pack is just manufactured or being transported. FIG. 14*b* shows the appearance of the battery pack when the terminal holder 32 is at the OFF position, as two indicating marks 65 on the terminal holder 32 are now pointing at an OFF label 63*a* on the housing 20. At its OFF position, only one row of the metal clips 52 are engaged with one row of metal pins 58, and the other row of metal clips 52 are offset from the other row of metal pins 58. The electrical connections of the internal circuit of the battery pack at this moment are shown in FIG. 14*b*. The batter pack contains ten groups 68 of battery cells which are connected in series to obtain the desired output voltage of the whole battery pack. Each group 68 may contain one battery cell, or more battery cells connected in parallel to obtain a desired output current. Because there are three sets of metal clips 52 on the terminal holder 32 and three sets of metal pins 58 on the circuit board 38, each set of the metal clips 52 together with its corresponding set of metal pins 58 form one switch 67 between two groups 68 of battery cells of in FIG. 14*b*. As the three switches 67 are open in FIG. 14*b* when the terminal holder 32 is in its OFF position, the groups 68 of battery cells are not electrically connected. As such, the internal circuit of the battery pack is not complete at this moment, and therefore the battery pack is not functional at this moment. Therefore, self-discharging of the battery pack may be avoided. Note that as shown in FIG. 12*b*, the metal clip 56 on the circuit board 38 is also not engaged with its corresponding metal plate 54 on the terminal holder 32.

If an end-user receives the battery pack and wants to put the battery pack in use, then there is no sophisticated setup steps required, nor is any external tool required. The user only needs to pull out the terminal holder 32 from the housing 20 of the battery pack, turn it 180 degrees, and then insert the terminal holder 32 into the battery pack again along the direction shown in FIG. 12*a*. FIG. 12*a* shows the status of the terminal holder 32 at its ON position, which is the position the terminal holder 32 is at when the battery pack is ready for use. FIG. 14*a* shows the appearance of the battery pack when the terminal holder 32 is at the ON position, as two indicating marks 65 on the terminal holder 32 are now pointing at an ON label 63*b* on the housing 20. At its ON position, both rows of metal clips 52 are now engaged with their respective rows of metal pins 58. The electrical connections of the internal circuit of the battery pack at this moment are shown in FIG. 14*a*, where the three switches 67 all are closed. The internal circuit of the battery pack is now complete, and therefore the battery pack is ready for putting into a charger or an electrical appliance for use. Note that as shown in FIG. 12*a*, the metal clip 56 on the circuit board 38 is also now engaged with its corresponding metal plate 54 on the terminal holder 32. It should also be noted that no matter the terminal holder 32 is at its OFF or ON position, as shown in FIGS. 12*a* and 12*b* one row of metal clips 52 on the terminal holder 32, which is the middle one of three sets of electrical terminals consists of the two rows of metal clips 52 and the metal plate 54, is always engaged with a same row of metal pins 58 on the circuit board 38, which is also the middle one of three sets of electrical terminals consisting of the two rows of metal pins 58 and the metal clip 56.

Figure 16:
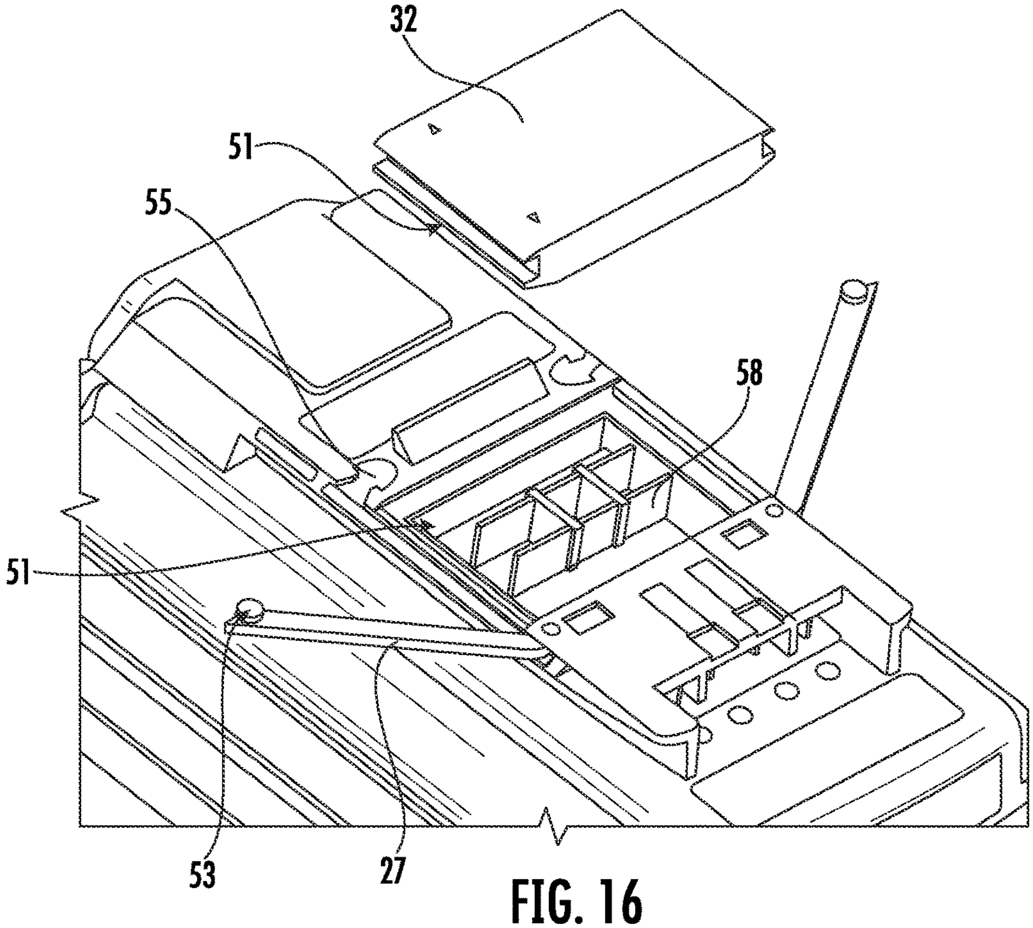
FIG. 16 shows the terminal holder in FIG. 15 which is away from the battery housing so that the electric terminals in the opening of the housing can be seen.

Turning now to FIGS. 15 and 16, which show how the terminal holder 32 can be locked by the first latch mechanism mentioned above. Note that although the terminal holder 32 is shown to be at or to be installed to its OFF position in FIGS. 15 and 16, it should be noted that due the symmetrical shape of the terminal holder 32, the first latch mechanism functions on the terminal holder 32 in exactly the same way when the latter is to be installed at the ON position. FIG. 15 shows the terminal holder 32 installed to the housing 20 of the battery pack, and the two arms 27 are pivoted away from the terminal holder 32 so that the end of the arms 27 with the round-shaped protrusion 53 is not secured to the corresponding round-shaped recess 55 on the housing 20. The terminal holder 32 at this moment is therefore not locked by the first latch mechanism, and can be freely taken out from the battery pack by the user, since the arms 27 are not locking the terminal holder 32 at the grooves 51 of the terminal holder 32. FIG. 16 also shows the arms 27 pivoted away from the housing 20, but in FIG. 16 the terminal holder 32 is shown to be separated from the battery pack. To lock the terminal holder 32 on the battery pack, the user only needs to pivot the arms 27 in FIG. 15 toward the terminal holder 32 until the round-shaped protrusion 53 is secured to the corresponding round-shaped recess 55 on the housing 20. The arms 27 then engage with the grooves 51 on the terminal holder 32 and lock the latter firmly on the battery pack, which are shown in FIG. 14*a* or FIG. 14*b*.

Figure 17A:
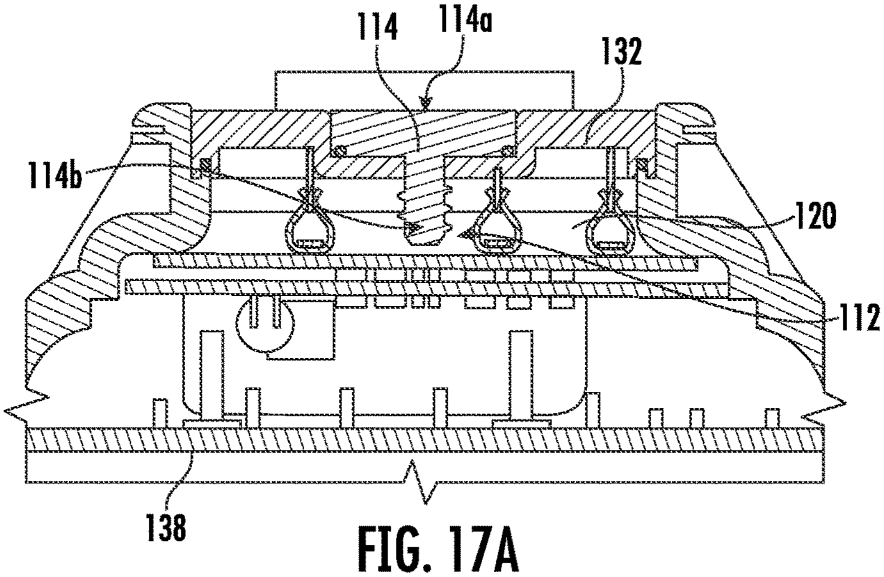
FIG. 17*a* is a cross-sectional view showing a terminal holder with a threaded fastening member is installed to the battery housing according to another embodiment of the invention.
Figure 17B:
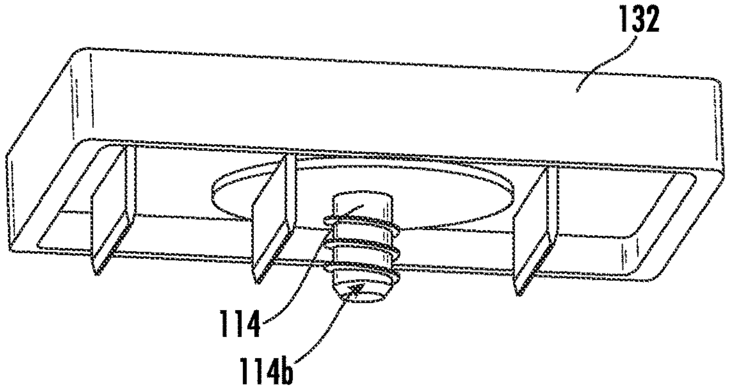
FIG. 17*b* shows the terminal holder of FIG. 17*a* alone.
Figure 17C:
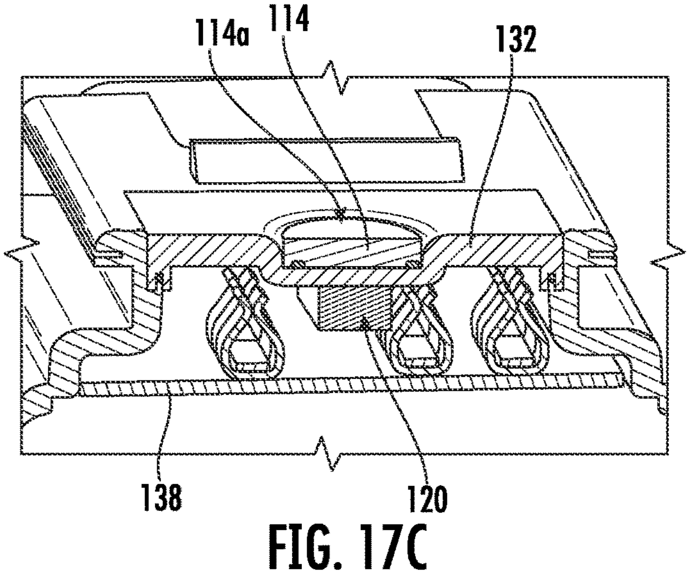
FIG. 17*c* is a perspective view showing the terminal holder installed to the battery housing in FIG. 17*a*.
Figure 19:
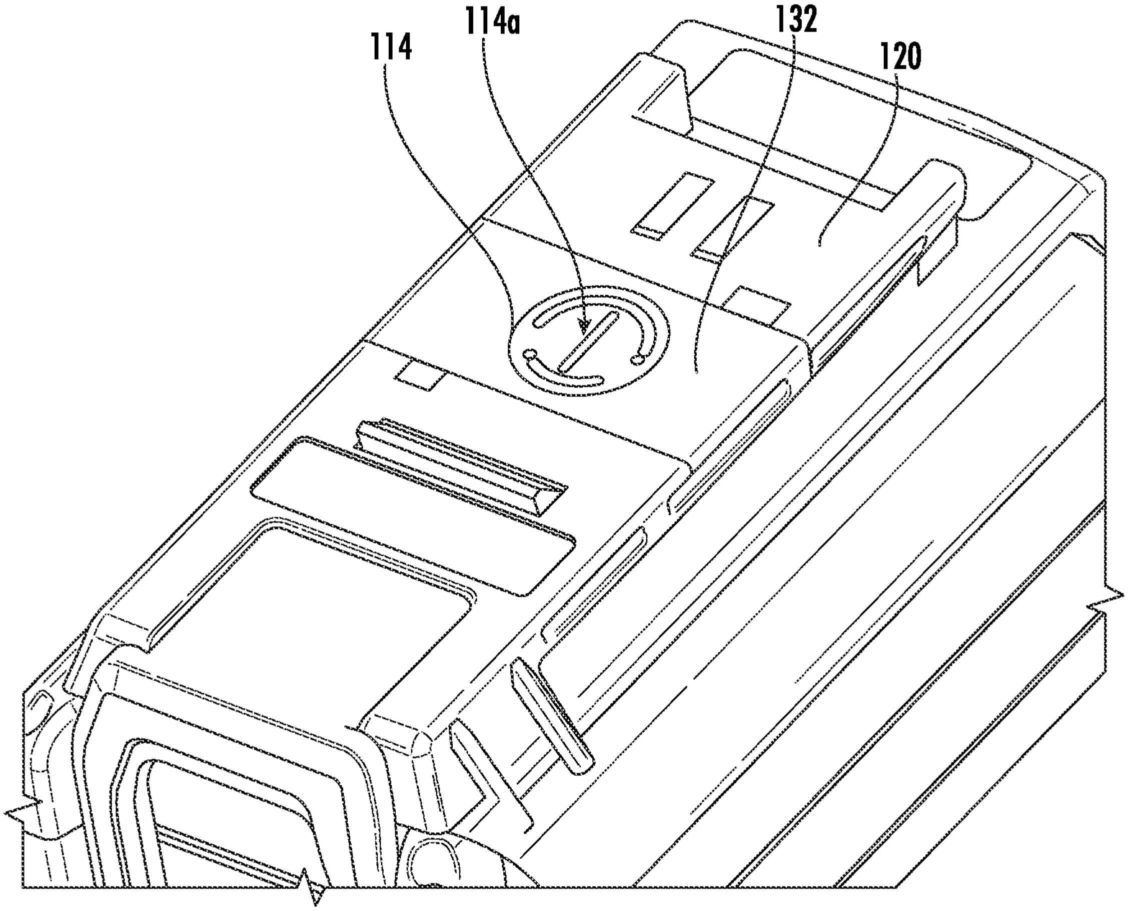
FIG. 19 shows the appearance of the battery pack with the terminal holder of FIG. 17*a* installed to the battery housing.

FIGS. 17*a*-17*c* and FIG. 19 show a different embodiment of the invention in which the first latch mechanism of the battery pack no longer contains pivotable arms. Rather, the terminal holder 132 in the battery pack now contains a knob 114 movably configured on the terminal holder 132. The terminal holder 132 and the circuit board 138 may contain similar electrical terminals as illustrated in FIGS. 4-6*b* and 12*a*-12*b*. The knob 114 acts as a fastening member of the first latch mechanism in this embodiment and contains a fastening end 114*b* as well as an actuating end 114*a*. The actuating end 114*a* is best shown in FIG. 19 which can be rotated by the user's fingers. The fastening end 114*b* contains exterior threads 113 and the fastening end 114*b* extends out of the bottom side of the terminal holder 132. On the housing 120 of the battery pack, there is a corresponding locking feature which are interior threads (not shown) formed in a cylindrical hole 112 formed on the housing 120. The user is able to lock the terminal holder 120 on the housing 120 of the battery pack by rotating the knob 114 along a direction so that the exterior threads 113 on the fastening end 114*b* mesh with the interior threads on the housing 120. As a result, the knob 114 can be removably engaged with the interior threads in the cylindrical hole 112. To unlock the terminal holder 120, the user just needs to rotate the knob 114 along a reverse direction. It should be noted that the part of the housing 120 formed with the corresponding locking feature which are interior threads (not shown) formed with the cylindrical hole 112 is offset from any terminals on the terminal holder 132 or the circuit board 138 as best shown in FIG. 17*c*.

Figure 18A:
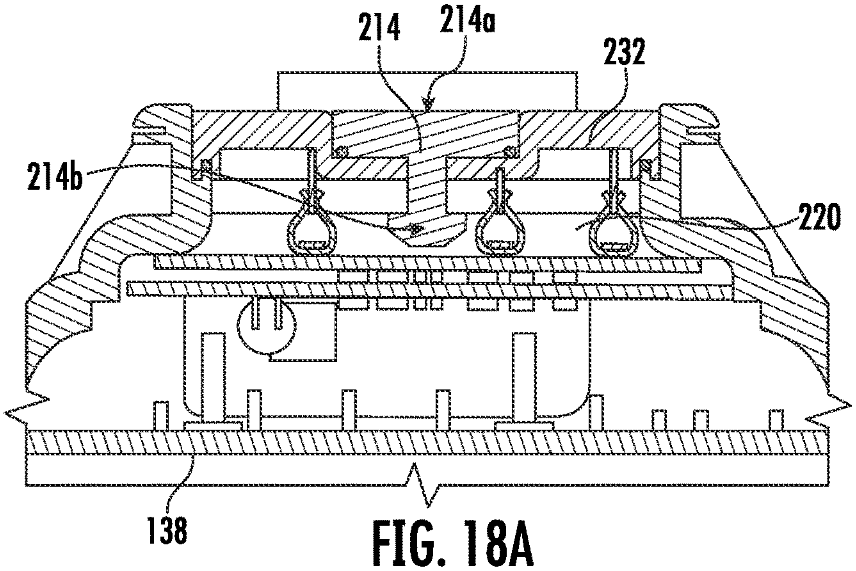
FIG. 18*a* is a cross-sectional view showing a terminal holder with a fastening member with anchor shape is installed to the battery housing according to another embodiment of the invention.
Figure 18B:
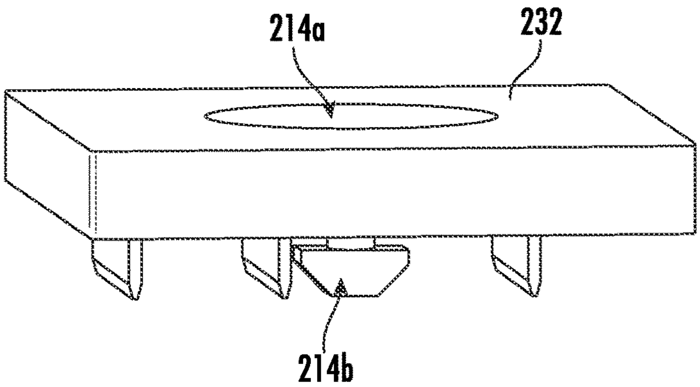
FIG. 18*b* shows the terminal holder of FIG. 18*a* alone.
Figure 18C:
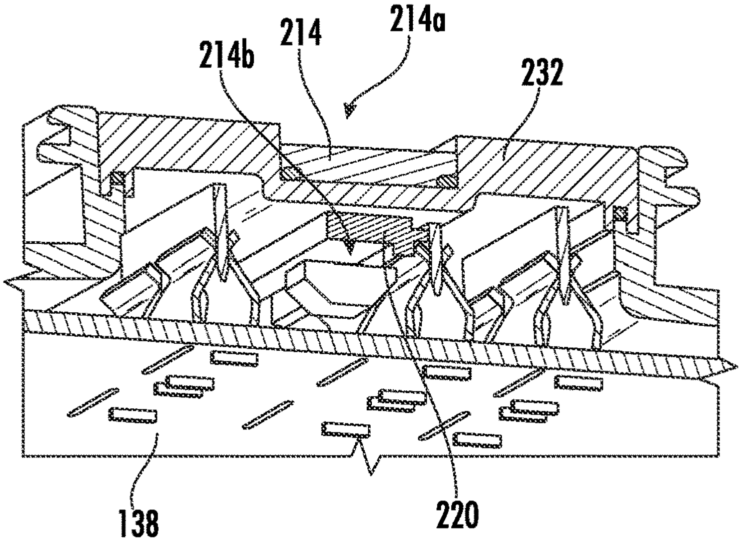
FIG. 18*c* is a perspective view showing the terminal holder installed to the battery housing in FIG. 18*a*.

FIGS. 18*a*-18*c* show a further embodiment of the invention that compared to the one in FIGS. 17*a*-17*c*, in FIGS. 18*a*-18*c* the knob 214 in the first latch mechanism of the battery pack no longer contains threads. Instead, the knob 214 on the terminal holder 232 contains an actuating end 214*a* similar to that in FIGS. 17*a*-17*c*, and a fastening end 214*b* with an asymmetrical cross-sectional shape. In particular, as shown in FIGS. 18*a*-18*c* the fastening end 214*b* of the terminal holder 232 has an anchor shape. The appearance of the knob 214 as viewed from the outside of the battery pack is similar to what is shown in FIG. 19. Although not shown in FIGS. 18*a*-18*c*, on the housing 220 of the battery pack there is a through0hole with a corresponding asymmetrical shape to that of the fastening end 214*b*. To install the terminal holder 232 on the battery pack, the user needs to press the terminal holder 232 to the opening (not shown) on the housing 220 of the battery pack with the orientation of the fastening end 214*b* matches with that of the through-hole on the housing 220, so that the fastening end 214*b* can pass through the through-hole by which the terminal holder 232 reaches its desired installation position. The user then rotates the knob 214 a little bit so that the orientation of the fastening end 214*b* is offset from that of the through-hole on the housing 220. In this way the terminal holder 232 can be locked on the battery pack since the fastening end 214*b* cannot pass through the through-hole in the reverse direction. If the user wants to remove the terminal holder 232 from the battery pack, he/she just needs to reverse the above operations. It should be noted that the part of the housing 220 formed with the corresponding locking feature which is the through-hole with asymmetrical cross-sectional shape is offset from any terminals on the terminal holder 232 or the circuit board 238 as best shown in FIG. 18*c*.

Figure 20A:
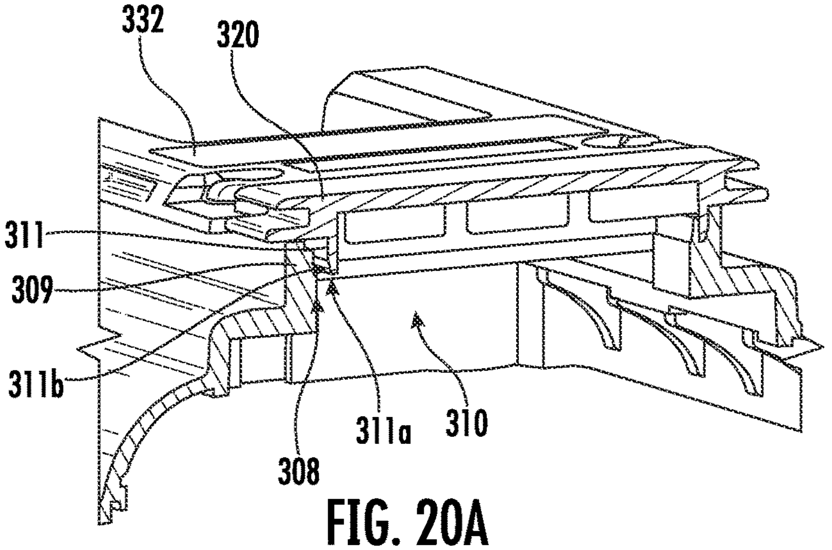
FIG. 20*a* is a cross-sectional view showing a terminal holder with resilient hook members that is installed to the battery housing according to another embodiment of the invention.
Figure 20B:
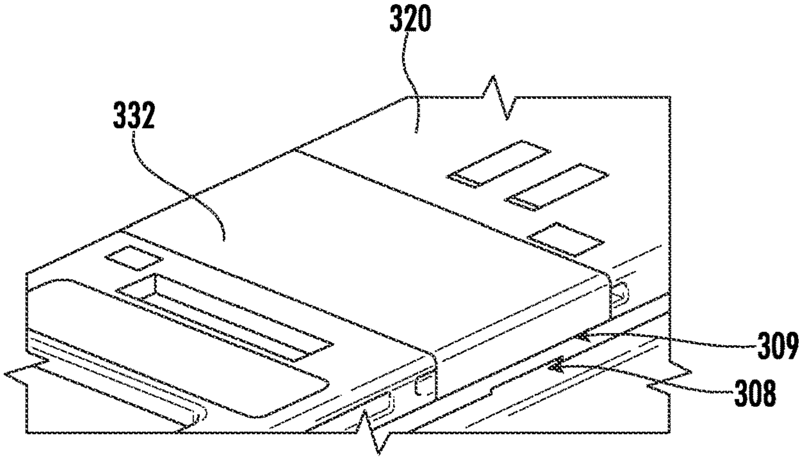
FIG. 20*b* shows the appearance of the battery pack with the terminal holder in FIG. 20*a*.
Figure 20C:
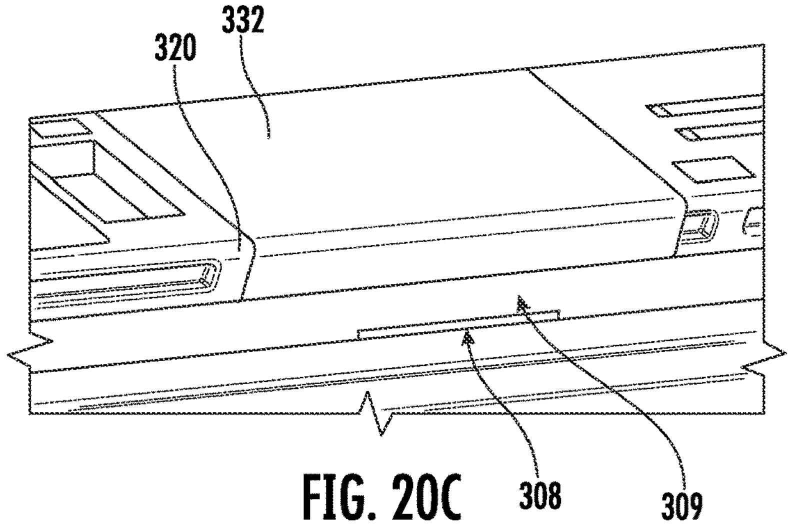
FIG. 20*c* shows the appearance of the battery pack with the terminal holder in FIG. 20*a* from another viewing angle.
Figure 21A:
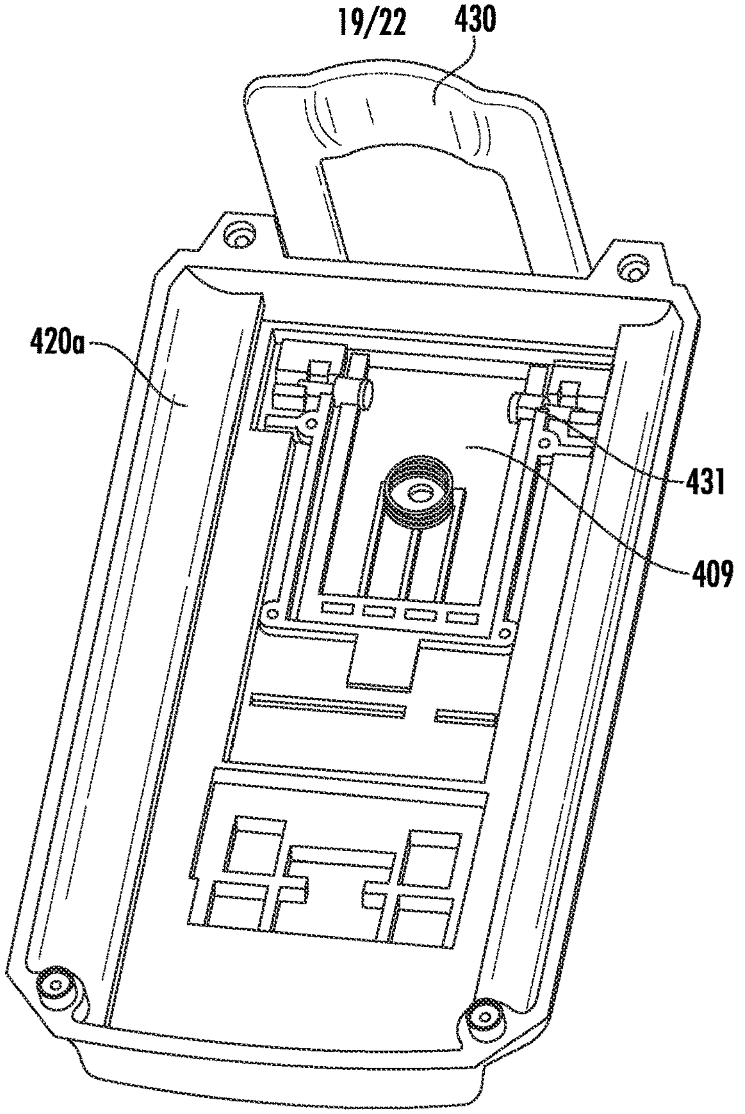
FIG. 21*a* shows a battery housing member with a pivoting structure thereon for a unlocking lever of the battery pack according to another embodiment of the invention.
Figure 21B:
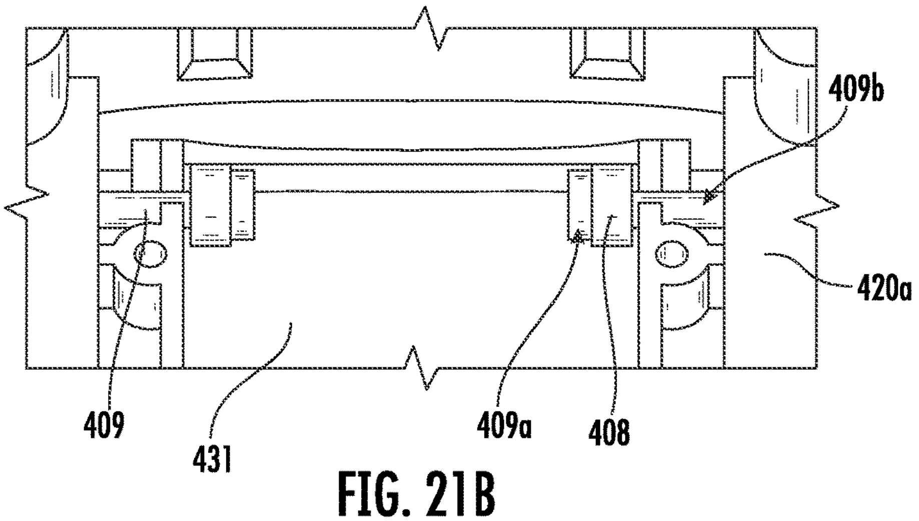
FIG. 21*b* is a closer view of the pivoting structure in FIG. 21*a*
Figure 21C:
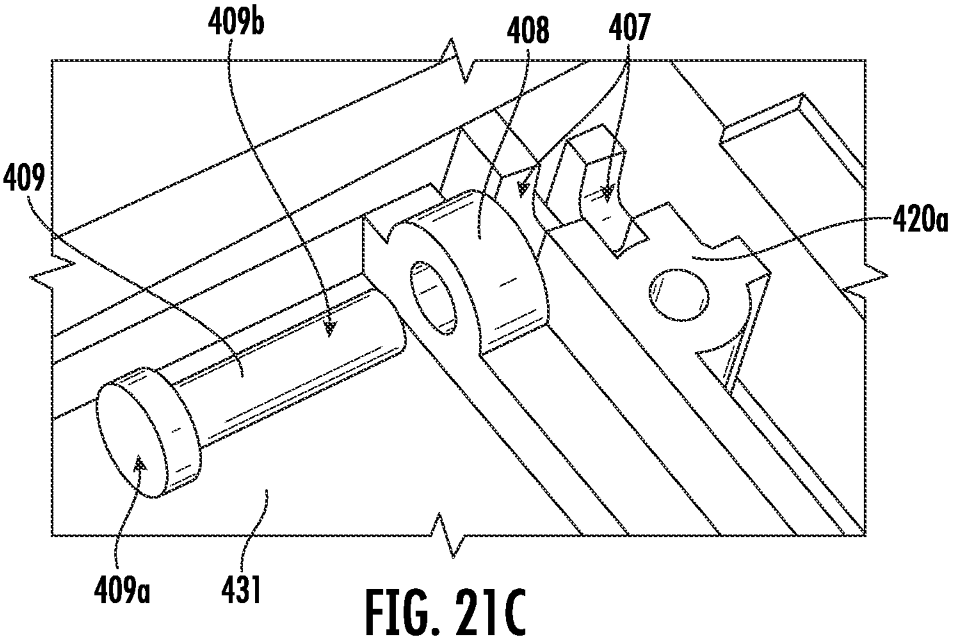
FIG. 21*c* shows how the hinge can be installed to a lug and recesses in the pivoting structure shown in FIGS. 21*a* and 21*b*.
Figure 21D:
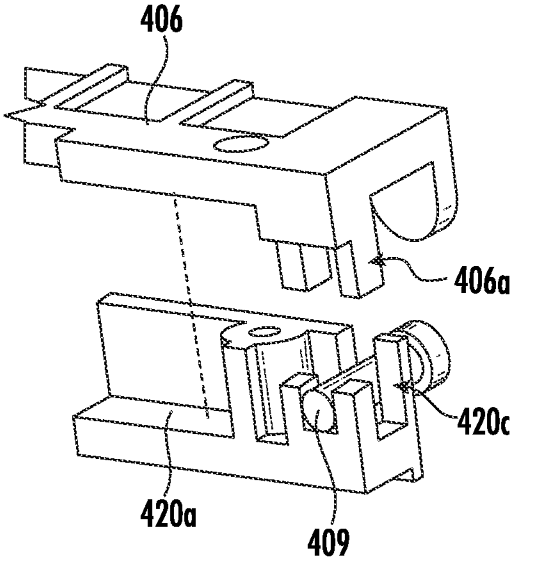
FIG. 21*d* shows how a push bottom cover can be installed to the first housing member to lock the hinge of FIGS. 21*a*-21*c*.
Figure 21E:
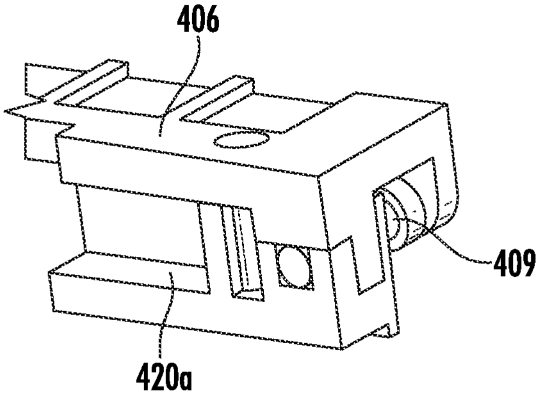
FIG. 21*e* shows the completed status when the push bottom cover is installed to the first housing member.

FIGS. 20*a*-20*c* show a further embodiment of the invention in which the first latch mechanism of the battery pack no longer contains parts which can significantly pivot or rotate. Rather, the terminal holder 332 in the battery pack now contains two resilient members 311. The two resilient members 311 as shown in FIG. 20*a* extend downwardly from the bottom side of the terminal holder 332. Each resilient member 311 appears generally as a hook with elongated trunk as the resilient member contains a hook end 311*a* connected by a rod portion 311*b* to the body of terminal holder 332. On the other side, the housing 320 of the battery pack has on the periphery of the opening 310 for the terminal holder 332 ribs 309 as the locking feature. There are two ribs 309 formed on two opposite edges of the opening 310 respectively and each rib 309 is separated from other part of the housing 320 by a small gap 308 enough to receive the hook end 311*a*. The rib 309 and the gap 308 together form a catch for the hook end 311*a* so that the hook end 311*a* is adapted to removably engage with the catch. To install and lock the terminal holder 332 on the housing 320 of the battery pack, the user aligns the terminal holder 332 with the opening 310, and then simply presses the terminal holder 332 toward the opening 310 and the two resilient members 311 at first also enter into the opening 310 as they are pressed by the interior side wall (not shown) of the housing 320 slightly toward each other due to their resilience. When the terminal holder 332 is properly positioned which is when the hook end 311*a* reaches the gap 308, the hook ends 311*a* extend through the gap 308 immediately due to the resilience of the resilient member 311 and thus the resilient member secures the rib 309. With the hook end 311*a* the terminal holder 332 will not easily drop out from the battery pack. To unlock the terminal holder 332, the user needs to insert external tools like pins or knife blades into the gaps 308 and urge both hook ends 311*a* of the two resilient members 311 at the same time, therefore forcing the hook ends 311*a* to leave the gaps 308. Then while keeping the positions of the hook ends 311*a* the user can takes out the terminal holder 332 from the opening 310. In this way, the FIGS. 21*a*-21*e* show a further embodiment of the invention in which a pivoting structure for an unlocking lever in a battery pack is illustrated. Such a pivoting structure may be used with the battery pack shown in FIGS. 1-4. FIG. 21*a* shows the unlocking lever with a user-actuated member 430 on its one end and a detent (not shown) on its other end. The user-actuated member 430 and the detent are connected by an intermediate member 431, and all three are formed as a single-piece integrally. The intermediate member 431 is connected by two hinges 409 at a position on the intermediate member 431 close to the bent location of the unlocking lever. On the intermediate member 431 there are formed two lugs 408 which allows the two hinges 409 to pass through respectively. A cap 409*a* of the hinge 409 is limited by the lug 408 but a tail end 409*b* of the hinge 409 passes through recesses 407 formed on a first housing member 420*a* of the battery pack. After the hinge 409 is placed in position relative to the lug 408 and the recesses 407, a push bottom cover 406 is then installed to the first housing member 420*a* and the push bottom cover 406 contains geometrical features 406*a* complemental to those shown by part 420*c* on the first housing member 420*a* around the recesses 407. The geometrical features 406*a* and 420*c* together form a complete shape which accurately accommodate the hinge 409.

Figure 22A:
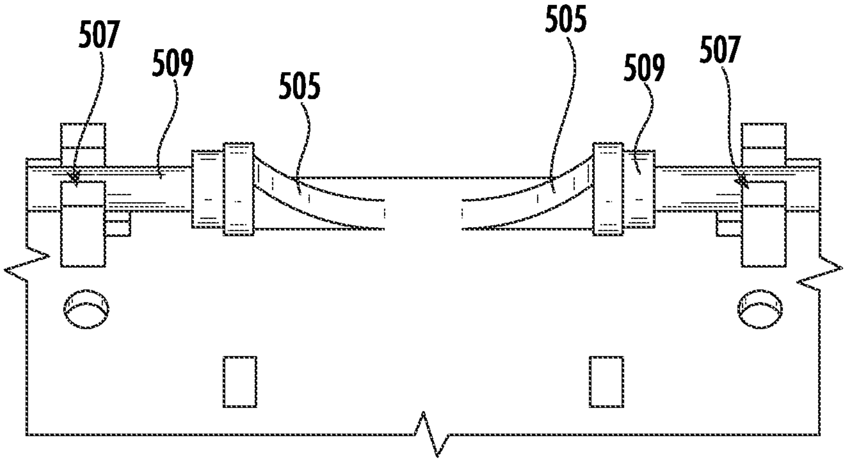
FIGS. 22*a* and 22*b* show respectively from different viewing angle an reinforcing structure in the form of ribs for the hinges in the pivoting structure according to another embodiment of the invention.
Figure 22B:
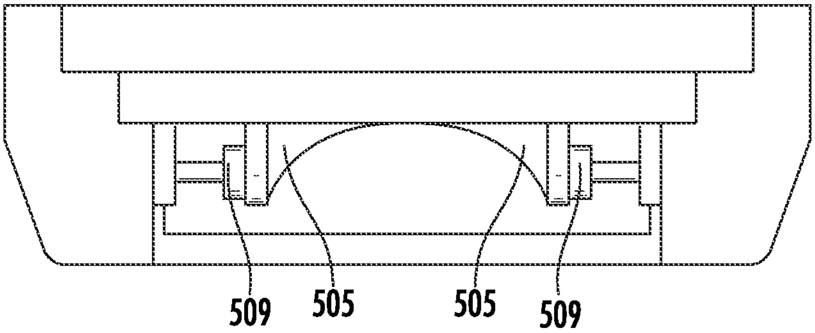

FIGS. 22*a*-22*b* show a further embodiment of the invention in which the hinges 509 in the pivoting structure for the unlocking lever in the battery pack is further reinforced by two ribs 505 facing at opposite directions. Each rib 505 faces a cap 509*a* of the hinge 509 which prevents the hinge 509 from unintentionally slipping away and leaving the recess 507 of the pivoting structure.

Figure 23:
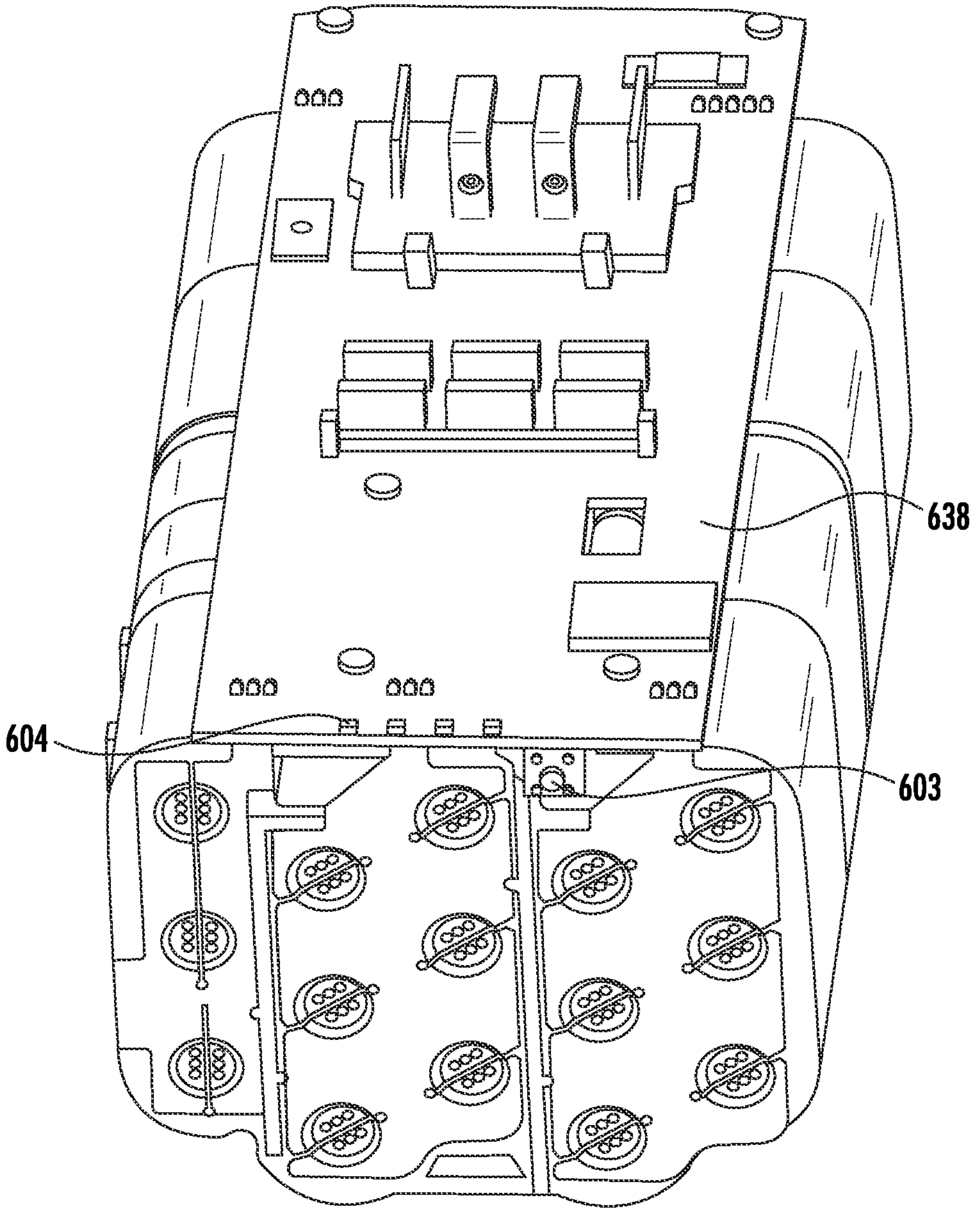
FIG. 23 shows LEDs and a switch configured on a circuit board of a battery pack according to another embodiment of the invention.

FIG. 23 shows a further embodiment of the invention in which there are LEDs 604 implemented on the circuit board 638. The LEDs 604 as display means allows certain indications to be presented to the user for diagnosis purposes of the battery pack. There is also a switch 603 configured on the circuit board 638 for activating the diagnosis function.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

It is to be understood that, if any prior art publication is referred to herein, such reference does not constitute an admission that the publication forms a part of the common general knowledge in the art, in Australia or any other country.

For example, the battery cells in the battery pack as described and illustrated above are accommodated in thorough holes in the battery frames. However, it is clear that other structures and mechanisms may also be used according to the user's preference to install and fix the battery cells, including but not limited to non-encircling battery racks, heat shrink tubing, etc.

Figure 13A:
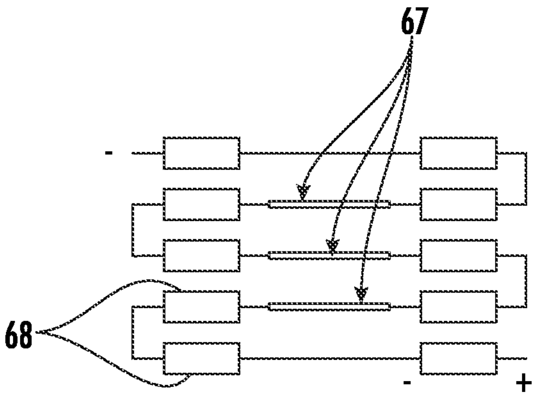
FIGS. 13*a* and 13*b* are schematic diagrams of internal circuits of the battery pack of FIGS. 1-4, with different status corresponding to the configuration of the terminal holder in FIGS. 12*a* and 12*b* respectively.
Figure 13B:
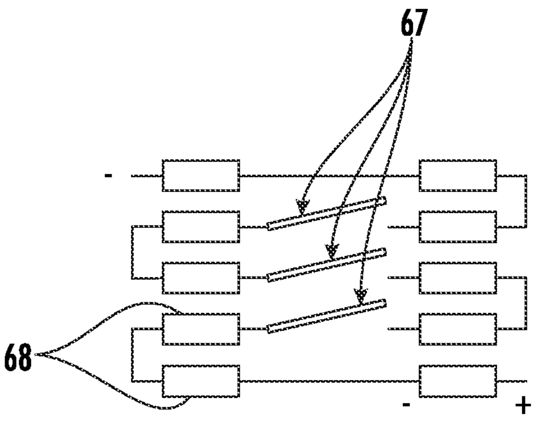

In addition, the battery pack internal circuit is exemplified in FIGS. 13*a*-13*b* as ten battery groups connected in series. Those skilled in the art should realize that the battery connections in battery packs according to the present invention are not limited to as such. The battery cells can be configured in parallel, in serial, or in hybrid to form a battery set, and the battery sets can also be configured in parallel, in serial, or in hybrid.

In the examples shown in FIGS. 13*a*-13*b* and 6*a*-6*b*, there are three switches formed by metal clips and metal pins on the terminal holder and the circuit which are part of the configurable connector provided in the internal electrical circuit of the battery pack, which are used as circuit breakers at certain points between the battery groups. However, it should be understood that any number of switches may be used in the configurable connector as long as they serve the purpose of interrupting the electrical circuit in the battery pack unless terminal connectors are inserted.

Several embodiments described above illustrate different first latch mechanisms of the battery pack that removably locks the terminal holder to the battery pack. Those skilled in the art should realize that any other latch mechanisms serving similar purposes for the battery pack would also follow closely the spirit of the invention.

What is claimed is:

1. A battery pack, comprising:

a housing;

two or more battery cells located in the housing, the two or more battery cells interconnected by a configurable connector which is configured to enable electrical connections between the two or more battery cells, the configurable connector comprising a plurality of first electrical terminals connected to a control circuit board of the two or more battery cells, at least one metal clip connected to the control circuit board, and a terminal holder removably couplable to the housing; and a first latch mechanism adapted to lock the terminal holder on the housing, the first latch mechanism comprising a fixed end pivotally coupled to the housing, a moveable end opposite the fixed end, and an arm extending between the fixed end and the moveable end;

wherein, the terminal holder is adapted to be installed to the housing in a first orientation at which the two or more battery cells are electrically connected, or in a second orientation at which the two or more battery cells are not electrically connected; and wherein the terminal holder comprises a plurality of second electrical terminals configured to be removably connected to the plurality of the first electrical terminals and a metal plate configured to be removably connected to the at least one metal clip, one of the plurality of the second electrical terminals always engaging with a same one of the plurality of the first electrical terminals when the terminal holder is installed to the housing in the first orientation or the second orientation.

2. The battery pack of claim 1, wherein the first orientation of the terminal holder and the second orientation of the terminal holder are 180° different from each other.

3. The battery pack of claim 2, wherein the terminal holder comprises three of the second electrical terminals arranged substantially along a straight line; the configurable connector comprising three of the first electrical terminals; a middle one of the three second electrical terminals always engaging with a same one of the first electrical terminals.

4. The battery pack of claim 2, wherein the terminal holder further comprises multiple sets of the second electrical terminals arranged substantially along a straight line; within at least one set of the multiple sets of the second electrical terminals, a plurality of said second electrical terminals arranged along a direction substantially perpendicular to the straight line.

5. The battery pack of claim 1, wherein the arm is adapted to cooperate with a corresponding locking feature on the terminal holder to lock the terminal holder on the housing.

6. The battery pack of claim 5, wherein the moveable end is adapted to move relative to the housing and removably secured to the housing.

7. The battery pack of claim 6, wherein the moveable end is adapted to be locked to the housing by snap-fitting.

8. The battery pack of claim 5, wherein the arm is adapted to pivot within a plane substantially vertical to a direction of installing the terminal holder to the housing; the locking feature of the terminal holder being a groove formed on the terminal holder which is adapted to at least partially accommodate the arm.

9. The battery pack of claim 1, wherein the first latch mechanism comprises a fastening member movably configured on the terminal holder; the fastening member adapted to removably engage with a corresponding locking feature on the housing to lock the terminal holder on the housing.

10. The battery pack of claim 9, wherein the fastening member is adapted to rotate relative to the terminal holder; the fastening member further comprising an actuating end and a fastening end.

11. The battery pack of claim 10, wherein the fastening end of the fastening member is formed with exterior threads; the locking feature on the housing being interior threads formed in a cylindrical hole formed on the housing.

12. The battery pack of claim 10, wherein the fastening end of the fastening member has an asymmetrical cross-sectional shape; the locking feature on the housing being a through-hole with corresponding asymmetrical shape to the asymmetrical cross-sectional shape of the fastening end.

13. The battery pack of claim 1, wherein the first latch mechanism comprises a resilient member configured on the terminal holder; the resilient member adapted to engage with a corresponding locking feature on the housing to lock the terminal holder on the housing.

14. The battery pack of claim 13, wherein resilient member comprises a hook end; the locking feature on the housing comprising a catch to which the hook end is adapted to removably engage.

15. The battery pack of claim 1, further comprises a second latch mechanism adapted to lock the battery pack to a power tool or a battery charger.

16. The battery pack of claim 15, wherein the second latch mechanism further comprises a detent movable between a first position at which the detent does not lock the battery pack to the power tool or the battery charger, and a second position at which the detent cooperates with a geometrical feature on the power tool or the battery charger; the detent connected with a user-actuated member, the movement of which urges the detent to move between the first position and the second position.

17. The battery pack of claim 16, wherein the detent is connected with the user-actuated member by an intermediate member; the intermediate member pivotally connected to the housing.

18. The battery pack of claim 17, wherein the detent, the intermediate member and the user-actuated member are formed integrally as a single-piece.

19. The battery pack of claim 17, wherein the detent is adapted to move along a direction which is substantially parallel to a longitudinal direction of the user-actuated member when the user-actuated member is not actuated by a user.

20. The battery pack of claim 17, wherein the intermediate member is connected by two separate pins to the housing; the pins acting as hinges for the intermediate member.

21. The battery pack of claim 1, wherein the first electrical terminals and the second electrical terminals are selected from the group consisting of: bent metal plates and metal strips.

22. The battery pack of claim 1, further comprises a circuit board on which the configurable connector is configured.

23. The battery pack of claim 22, wherein the circuit board is coated with a waterproof coating.

24. The battery pack of claim 22, wherein the circuit board is configured with a plurality of display elements which are adapted for diagnosis purposes.

25. The battery pack of claim 1, wherein for at least one of the two or more battery cells, a gasket is affixed to an electrode thereof; the gasket cooperating with a contact pad soldered to the electrode to provide a waterproof function.

26. The battery pack of claim 1, wherein the housing is configured with a sealing member located around an opening of the housing; the opening adapted to receive an external component which fits with the housing; the sealing member adapted to seal the opening when the external component is installed to the housing.

27. The battery pack of claim 26, wherein the sealing member is an O-ring.

28. The battery pack of claim 26, wherein the sealing member is made of overmold material.

29. The battery pack of claim 26, wherein the external component is the terminal holder.

* * * * *